United States Patent
Sugahara et al.

(10) Patent No.: US 11,680,140 B2
(45) Date of Patent: Jun. 20, 2023

(54) PARTICLE-DISPERSED POLYIMIDE PRECURSOR SOLUTION, METHOD FOR PRODUCING POROUS POLYIMIDE FILM, AND POROUS POLYIMIDE FILM

(71) Applicant: FUJIFILM Business Innovation Corp., Tokyo (JP)

(72) Inventors: Hajime Sugahara, Kanagawa (JP); Hidekazu Hirose, Kanagawa (JP); Kosaku Yoshimura, Kanagawa (JP); Tomoya Sasaki, Kanagawa (JP); Yasunobu Kashima, Kanagawa (JP); Kosuke Nakada, Kanagawa (JP); Tomoyo Okubo, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 165 days.

(21) Appl. No.: 17/146,436

(22) Filed: Jan. 11, 2021

(65) Prior Publication Data
US 2022/0064379 A1 Mar. 3, 2022

(30) Foreign Application Priority Data
Sep. 3, 2020 (JP) .............................. JP2020-148427

(51) Int. Cl.
*C08G 73/10* (2006.01)
*C08J 9/26* (2006.01)

(52) U.S. Cl.
CPC ............ *C08G 73/1032* (2013.01); *C08J 9/26* (2013.01); *C08J 2379/08* (2013.01)

(58) Field of Classification Search
CPC .. C08L 79/08; B01D 2325/02; C08J 2379/08; C08G 73/1032
See application file for complete search history.

(56) References Cited

U.S. PATENT DOCUMENTS

| | | | | |
|---|---|---|---|---|
| 2016/0072110 A1* | 3/2016 | Sugawara | ............... | B32B 27/34 429/144 |
| 2016/0111695 A1* | 4/2016 | Kanamura | .......... | H01M 10/058 264/49 |
| 2018/0244886 A1* | 8/2018 | Nukada | ................ | C08G 73/105 |

FOREIGN PATENT DOCUMENTS

JP 2014159519 9/2014

* cited by examiner

*Primary Examiner* — Gregory Listvoyb
(74) *Attorney, Agent, or Firm* — JCIPRNET

(57) ABSTRACT

A particle-dispersed polyimide precursor solution contains: a polyimide precursor consisting of a polymer of a tetracarboxylic dianhydride and a diamine containing a fluorene-based diamine having a fluorene skeleton; particles; and an aqueous solvent containing water.

15 Claims, 1 Drawing Sheet

PARTICLE-DISPERSED POLYIMIDE PRECURSOR SOLUTION, METHOD FOR PRODUCING POROUS POLYIMIDE FILM, AND POROUS POLYIMIDE FILM

CROSS-REFERENCE TO RELATED APPLICATIONS

This application is based on and claims priority under 35 USC 119 from Japanese Patent Application No. 2020-148427 filed Sep. 3, 2020.

BACKGROUND

(i) Technical Field

The present invention relates to a particle-dispersed polyimide precursor solution, a method for producing a porous polyimide film, and a porous polyimide film.

(ii) Related Art

JP2014-159519A proposes "a polyimide resin by imidizing and polymerizing, in the presence of a reaction solvent: a tetracarboxylic dianhydride of 3,3',4,4'-diphenylsulfonatetracarboxylic dianhydride (A) and 3,3',4,4'-biphenyltetracarboxylic dianhydride (B); and a fluorene skeleton diamine (C) at a molar ratio of (A):(B)=40:60 to 80:20 and at a molar ratio (C) in the range of 90 to 110 with respect to the total molar ratio of (A) and (B)".

SUMMARY

An object of the present invention is to provide a particle-dispersed polyimide precursor solution capable of providing a porous polyimide film having a lower dielectric constant as compared with a particle-dispersed polyimide precursor solution containing: a polyimide precursor consisting of a polymer of a tetracarboxylic dianhydride and a diamine containing a fluorene-based diamine having a fluorene skeleton, particles; and a solvent containing only an organic solvent, and a particle-dispersed polyimide precursor solution containing: a polyimide precursor consisting of a polymer of a tetracarboxylic dianhydride and a diamine containing only m-phenylenediamine; particles; and an aqueous solvent containing water.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

The object is achieved by the following aspect. That is,
<1>
A particle-dispersed polyimide precursor solution, including:
a polyimide precursor consisting of a polymer of a tetracarboxylic dianhydride and a diamine containing a fluorene-based diamine having a fluorene skeleton;
particles; and
an aqueous solvent containing water.

BRIEF DESCRIPTION OF THE DRAWINGS

Exemplary embodiment(s) of the present invention will be described in detail based on the following figures, wherein.

DETAILED DESCRIPTION

Figure 1A:
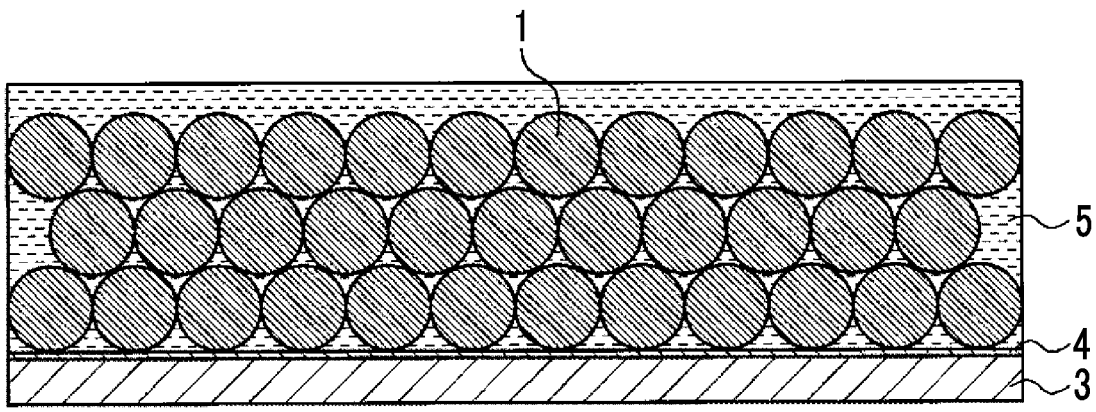
FIGS. 1A, 1B, and 1C are process diagrams showing an example of a method for producing a porous polyimide film of the present exemplary embodiment.

Hereinafter, exemplary embodiments that are an example of the present invention will be described. These descriptions and examples exemplify the exemplary embodiments and do not limit the scope of the invention.

In the numerical ranges described stepwise in the present specification, the upper limit value or the lower limit value described in one numerical range may be replaced with the upper limit value or the lower limit value of another stepwise described numerical range. Further, in the numerical range described in the present specification, the upper limit value or the lower limit value of the numerical range may be replaced with the value shown in the examples.

Each component may include a plurality of types of the corresponding substances.

In the case of referring to the amount of each component in the composition, in a case where there are a plurality of substances corresponding to each component in the composition, the amount means the total amount of the plurality of substances present in the composition unless otherwise indicated.

In the present exemplary embodiment, the "film" is a concept that encompasses not only what is generally called "film" but also what is commonly called "sheet".

Particle-Dispersed Polyimide Precursor Solution

A particle-dispersed polyimide precursor solution (hereinafter, may be simply referred to as "polyimide precursor solution") of the present exemplary embodiment contains: a polyimide precursor consisting of a polymer of a tetracarboxylic dianhydride and a diamine containing a fluorene-based diamine having a fluorene skeleton; particles; and an aqueous solvent containing water.

In the particle-dispersed polyimide precursor solution according to the present exemplary embodiment, a particle-dispersed polyimide precursor solution capable of providing a porous polyimide film having a lower dielectric constant can be obtained by the above configuration. The reason is presumed as follows.

Porous polyimide films have pores inside, and thus have a low dielectric constant and are sometimes used as a low dielectric constant material. Further reduction of the dielectric constant of the porous polyimide film is required from the viewpoint of further performance improvement as a low dielectric constant material.

The porous polyimide film may be produced by using a particle-dispersed polyimide precursor solution containing a polyimide precursor consisting of a polymer of tetracarboxylic dianhydride and a diamine, particles, and a solvent. In a method for producing a porous polyimide film using a particle-dispersed polyimide precursor solution, first, a coating film of the particle-dispersed polyimide precursor solution is formed, and then the coating film is dried to form a film containing the polyimide precursor and the particles. Subsequently, the film is heated to remove the particles and the polyimide precursor is imidized to produce a porous polyimide film. As a method for removing the particles, a method of removing the particles from the polyimide precursor and the film containing the particles using a solvent that dissolves only the particles may also be used.

Here, the pores of the porous polyimide film are mainly formed by removing the particles. In order to reduce the dielectric constant of the porous polyimide film, the porous polyimide film preferably includes, for example, a structure in which the pores communicate with each other. The reason why the dielectric constant of the porous polyimide film decreases in a case where the porous polyimide film contains a structure in which the pores communicate with each other is that the pore structure increases, that is, the free volume space increases. That is, the space of low electron density in the porous polyimide film system becomes large.

The particle-dispersed polyimide precursor solution of the present exemplary embodiment contains a polyimide precursor consisting of a polymer of a tetracarboxylic dianhydride and a diamine containing a fluorene-based diamine having a fluorene skeleton. The fluorene skeleton is a structure with large steric hindrance. Therefore, the polyimide precursor contained in the particle-dispersed polyimide precursor solution according to the present exemplary embodiment is less likely to overlap densely due to steric hindrance between the molecular chains of the polyimide precursor. That is, there are gaps between the molecular chains of the polyimide precursor. Further, the particle-dispersed polyimide precursor solution according to the present exemplary embodiment contains an aqueous solvent containing water. Aqueous solvents containing water tend to have a low boiling point. Therefore, in a case where a porous polyimide film is produced by the above-mentioned method using the particle-dispersed polyimide precursor solution according to the present exemplary embodiment, the aqueous solvent easily boils in the gap between the polyimide precursors in the process of drying and heating the film. The aqueous solvent boiled in the gaps between the molecular chains of the polyimide precursor eventually becomes vapor and volatilizes in the film to form pores. Then, the pores are formed in the gaps between the particles contained in the film. As a result, the pores formed by removing the particles contained in the film can easily communicate with each other. Thus, the obtained porous polyimide film contains a large number of structures in which the pores are communicated with each other.

Thus, by producing a porous polyimide film using the particle-dispersed polyimide precursor solution of the present exemplary embodiment, a porous polyimide film containing a large number of structures in which the pores communicate with each other is obtained. Therefore, it is presumed that by producing a porous polyimide film using the particle-dispersed polyimide precursor solution of the present exemplary embodiment, a porous polyimide film having a lower dielectric constant can be obtained.

Polyimide Precursor

The polyimide precursor consists of a polymer of tetracarboxylic dianhydride and a diamine containing a fluorene-based diamine having a fluorene skeleton.

Examples of the tetracarboxylic dianhydride include both aromatic and aliphatic compounds, and may be, for example, aromatic compounds.

Examples of the aromatic tetracarboxylic dianhydride include pyromellitic anhydride, 3,3',4,4'-benzophenonetetracarboxylic dianhydride, 3,3',4,4'-diphenylsulfonetetracarboxylic dianhydride, 4,4'-oxydiphthalic anhydride, 3,4'-oxydiphthalic anhydride, 3,3',4,4'-biphenyltetracarboxylic dianhydride, 2,3,3',4'-biphenyltetracarboxylic dianhydride, 4,4'-(hexafluoroisopropylidene)diphthalic anhydride, 2,2-bis(3,4-dicarboxyphenyl)propane dianhydride, bis(3,4-dicarboxyphenyl)methane dianhydride, 1,4-bis(3,4-dicarboxyphenoxy)benzene dianhydride, 1,4-bis(2,3-dicarboxyphenoxy)benzene dianhydride, p-phenylenebis (trimellitate anhydride), m-bis(trimellitate anhydride), 2,2-bis[4-(3,4-dicarboxyphenoxy)phenyl]propane dianhydride, naphthalene-1,4,5,8-tetracarboxylic dianhydride, naphthalene-2,3,6,7-tetracarboxylic dianhydride, 9,9-bis(3,4-dicarboxyphenyl)fluorene dianhydride, 4,4'-diphenylether bis (trimellitate anhydride), 4,4'-diphenylmethane bis (trimellitate anhydride), 4,4'-bis(3,4-dicarboxyphenoxy) diphenylsulfide dianhydride, 4,4'-bis(3,4-dicarboxyphenoxy)diphenylsulfone dianhydride, 4,4'-bis(3, 4-dicarboxyphenoxy)diphenylether dianhydride, 2,2-bis(4-hydroxyphenyl)propanbis(trimellitate anhydride), p-terphenyltetracarboxylic dianhydride, m-terphenyltetracarboxylic dianhydride, and the like.

Examples of the aliphatic tetracarboxylic dianhydride include aliphatic or alicyclic tetracarboxylic dianhydride such as butane tetracarboxylic dianhydride, 1,2,3,4-cyclobutane tetracarboxylic dianhydride, 1,3-dimethyl-1,2,3,4-cyclobutane tetracarboxylic dianhydride, 1,2,3,4-cyclopentane tetracarboxylic dianhydride, 2,3,5-tricarboxycyclopentyl acetic dianhydride, 3,5,6-tricarboxynorbornane-2-acetic dianhydride, 2,3,4,5-tetrahydrofuran tetracarboxylic dianhydride, 5-(2,5-dioxotetrahydrofuryl)-3-methyl-3-cyclohexene-1,2-di carboxylic dianhydride, and bicyclo[2,2,2]-oct-7-ene-2,3,5,6-tetracarboxylic dianhydride; an aliphatic tetracarboxylic dianhydride having an aromatic ring such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2, 5-dioxo-3-furanyl)-naphtho[1,2-c]furan-1,3-dione; and the like.

Among these, the tetracarboxylic dianhydride may be, for example, an aromatic tetracarboxylic dianhydride, and specifically, for example, pyromellitic anhydride, 3,3',4,4'-benzophenonetetracarboxylic dianhydride, 4,4'-oxydiphthalic anhydride, 3,3',4,4'-biphenyltetracarboxylic dianhydride, and may be 2,3,3',4'-biphenyltetracarboxylic dianhydride, and further, may be pyromellitic dianhydride, 3,3',4,4'-biphenyltetracarboxylic dianhydride, and 3,3',4,4'-benzophenonetetracarboxylic dianhydride, and in particular, may be 3,3',4,4'-biphenyltetracarboxylic dianhydride.

The tetracarboxylic dianhydride may be used alone or in combination of two or more kinds thereof.

In addition, in a case of the combination use of two or more kinds thereof, the aromatic tetracarboxylic dianhydride or the aliphatic tetracarboxylic acid may be used in combination, or the aromatic tetracarboxylic dianhydride and the aliphatic tetracarboxylic dianhydride may be combined to be used.

Diamine is a compound having two amino groups in the molecular structure.

The diamine contains a fluorene-based diamine having at least one fluorene skeleton (hereinafter, may be simply referred to as "fluorene-based diamine").

Here, the fluorene skeleton refers to the following structure.

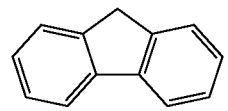 [SMILES: c1ccc2c(c1)Cc1ccccc1-2]

From the viewpoint of increasing steric hindrance of the polyimide precursor, the fluorene-based diamine preferably has, for example, one or more substituents at the 9-position of the fluorene skeleton, and more preferably has two substituents at the 9-position of the fluorene skeleton.

Examples of the substituent bonded to the 9-position of the fluorene skeleton include an alkyl group, an alkenyl group, and an aryl group, and an aryl group is preferable from the viewpoint of further increasing the steric hindrance of the polyimide precursor. The substituent bonded to the 9-position of the fluorene skeleton may have another substituent on the substituent.

It is preferable that the fluorene-based diamine has two aryl groups at the 9-position of the fluorene skeleton, and the two amino groups of the fluorene-based diamine are bonded to two aryl groups bonded to the 9-position of the fluorene skeleton one by one, for example.

By using a fluorene-based diamine having such a structure, a particle-dispersed polyimide precursor solution capable of providing a porous polyimide film having a lower dielectric constant can be easily obtained. The reason is presumed as follows.

A diamine in which two aryl groups are at the 9-position of the fluorene skeleton and the two amino groups of the fluorene-based diamine respectively bonded to two aryl groups bonded to the 9-position of the fluorene skeleton has a greatly sterically hindered structure called a cardo structure. Thus, the steric hindrance of the polyimide precursor obtained by using the diamine becomes even greater. Therefore, the gap between the molecular chains of the polyimide precursor becomes larger. This makes it easier for the aqueous solvent to boil in the gaps between the molecular chains of the polyimide precursor in the production of the porous polyimide film. Thus, it becomes easier to obtain a porous polyimide film having communicating pores.

Thus, by using a diamine in which two aryl groups are at the 9-position of the fluorene skeleton and the two amino groups of the fluorene-based diamine respectively bonded to two aryl groups bonded to the 9-position of the fluorene skeleton as the fluorene-based diamine, a particle-dispersed polyimide precursor solution capable of providing a porous polyimide film having a lower dielectric constant can be easily obtained.

Specific examples of the fluorene-based diamine include 9,9-bis[4-(4-aminophenoxy)phenyl]fluorene, 9,9-bis[4-(4-aminophenoxy)-3-phenylphenyl]fluorene, 9,9-bis[4-(3-aminophenoxy)-3-phenylphenyl]fluorene, 9,9-bis[4-(2-aminophenoxy)-3-phenylphenyl]fluorene, 9,9-bis[4-(4-amino-3-methylphenoxy)-3-phenylphenyl]fluorene, 9,9-bis[4-(4-amino-2-methylphenoxy)-3-phenylphenyl]fluorene, 9,9-bis[4-(4-amino-3-ethylphenoxy)-3-phenylphenyl]fluorene, 9,9-bis[4-(4-amino-2-ethylphenoxy)-3-phenylphenyl]fluorene, 9,9-bis[4-(4-amino-3-i-propylphenoxy)-3-phenylphenyl]fluorene, 9,9-bis[4-(4-amino-2-i-propylphenoxy)-3-phenylphenyl]fluorene, 9,9-bis[4-(4-amino-3-t-butylphenoxy)-3-phenylphenyl]fluorene, 9,9-bis[4-(4-amino-2-t-butylphenoxy)-3-phenylphenyl]fluorene, 9,9-bis[4-(4-amino-3-trifluoromethylphenoxy)-3-phenylphenyl]fluorene, 9,9-bis[4-(4-amino-2-trifluoromethylphenoxy)-3-phenylphenyl]fluorene, 9,9-bis[4-(3-amino-2-methylphenoxy)-3-phenylphenyl]fluorene, 9,9-bis[4-(3-amino-4-methylphenoxy)-3-phenylphenyl]fluorene, 9,9-bis[4-(3-amino-5-methylphenoxy)-3-phenylphenyl]fluorene, 9,9-bis[4-(3-amino-6-methylphenoxy)-3-phenylphenyl]fluorene, 9,9-bis[4-(3-amino-2-trifluoromethylphenoxy)-3-phenylphenyl]fluorene, 9,9-bis[4-(3-amino-4-trifluoromethylphenoxy)-3-phenylphenyl]fluorene, 9,9-bis[4-(3-amino-5-trifluoromethylphenoxy)-3-phenylphenyl]fluorene, 9,9-bis[4-(3-amino-6-trifluoromethylphenoxy)-3-phenylphenyl]fluorene, 9,9-bis[4-(2-amino-3-methylphenoxy)-3-phenylphenyl]fluorene, 9,9-bis[4-(2-amino-4-methylphenoxy)-3-phenylphenyl]fluorene, 9,9-bis[4-(2-amino-5-methylphenoxy)-3-phenylphenyl]fluorene, 9,9-bis[4-(2-amino-6-methylphenoxy)-3-phenylphenyl]fluorene, 9,9-bis[4-(2-amino-3-trifluoromethylphenoxy)-3-phenylphenyl]fluorene, 9,9-bis[4-(2-amino-4-trifluoromethylphenoxy)-3-phenylphenyl]fluorene, 9,9-bis[4-(2-amino-5-trifluoromethylphenoxy)-3-phenylphenyl]fluorene, 9,9-bis[4-(2-amino-6-trifluoromethylphenoxy)-3-phenylphenyl]fluorene, 9,9-bis[4-(4-amino-2-methylphenoxy)phenyl]fluorene, 9,9-bis[4-(4-amino-2-ethylphenoxy)phenyl]fluorene, 9,9-bis[4-(4-amino-2-n-propylphenoxy)phenyl]fluorene, 9,9-bis[4-(4-amino-2-i-propylphenoxy)phenyl]fluorene, 9,9-bis[4-(4-amino-2-t-butylphenoxy)phenyl]fluorene, 9,9-bis[4-(4-amino-2-trifluoromethylphenoxy)phenyl]fluorene, 9,9-bis[4-(4-amino-3-methylphenoxy)phenyl]fluorene, 9,9-bis[4-(4-amino-3-ethylphenoxy)phenyl]fluorene, 9,9-bis[4-(4-amino-3-n-propylphenoxy)phenyl]fluorene, 9,9-bis[4-(4-amino-3-i-propylphenoxy)phenyl]fluorene, 9,9-bis[4-(4-amino-3-t-butylphenoxy)phenyl]fluorene, 9,9-bis[4-(4-amino-3-trifluoromethylphenoxy)phenyl]fluorene, 9,9-bis[4-(2-amino-3-methylphenoxy)phenyl]fluorene, 9,9-bis[4-(2-amino-4-methylphenoxy)phenyl]fluorene, 9,9-bis[4-(2-amino-5-methylphenoxy)phenyl]fluorene, 9,9-bis[4-(2-amino-6-methylphenoxy)phenyl]fluorene, 9,9-bis[4-(2-amino-3-ethylphenoxy)phenyl]fluorene, 9,9-bis[4-(2-amino-4-ethylphenoxy)phenyl]fluorene, 9,9-bis[4-(2-amino-5-ethylphenoxy)phenyl]fluorene, 9,9-bis[4-(2-amino-6-ethylphenoxy)phenyl]fluorene, 9,9-bis[4-(2-amino-3-n-propylphenoxy)phenyl]fluorene, 9,9-bis[4-(2-amino-4-n-propylphenoxy)phenyl]fluorene, 9,9-bis[4-(2-amino-5-n-propylphenoxy)phenyl]fluorene, 9,9-bis[4-(2-amino-6-n-propylphenoxy)phenyl]fluorene, 9,9-bis[4-(2-amino-3-i-propylphenoxy)phenyl]fluorene, 9,9-bis[4-(2-amino-4-i-propylphenoxy)phenyl]fluorene, 9,9-bis[4-(2-amino-5-i-propylphenoxy)phenyl]fluorene, 9,9-bis[4-(2-amino-6-i-propylphenoxy)phenyl]fluorene, 9,9-bis[4-(2-amino-3-t-butylphenoxy)phenyl]fluorene, 9,9-bis[4-(2-amino-4-t-butylphenoxy)phenyl]fluorene, 9,9-bis[4-(2-amino-5-t-butylphenoxy)phenyl]fluorene, 9,9-bis[4-(2-amino-6-t-butylphenoxy)phenyl]fluorene, 9,9-bis[4-(2-amino-3-trifluoromethylphenoxy)phenyl]fluorene, 9,9-bis[4-(2-amino-4-trifluoromethylphenoxy)phenyl]fluorene, 9,9-bis[4-(2-amino-5-trifluoromethylphenoxy)phenyl]fluorene, 9,9-bis[4-(2-amino-6-trifluoromethylphenoxy)phenyl]fluorene, 9,9-bis[4-(4-amino-2-methylphenoxy)-3-methylphenyl]fluorene, 9,9-bis[4-(4-amino-2-ethylphenoxy)-3-methylphenyl]fluorene, 9,9-bis[4-(4-amino-2-n-propylphenoxy)-3-methylphenyl]fluorene, 9,9-bis[4-(4-amino-2-i-propylphenoxy)-3-methylphenyl]fluorene, 9,9-bis[4-(4-amino-2-t-butylphenoxy)-3-methylphenyl]fluorene, 9,9-bis[4-(4-amino-2-trifluoromethylphenoxy)-3-methylphenyl]fluorene, 9,9-bis[4-(4-amino-2-methylphenoxy)-3-ethylphenyl]fluorene, 9,9-bis[4-(4-amino-2-ethylphenoxy)-3-ethylphenyl]fluorene, 9,9-bis[4-(4-amino-2-n-propylphenoxy)-3-ethylphenyl]fluorene, 9,9-bis[4-(4-amino-2-i-propylphenoxy)-3-ethylphenyl]fluorene, 9,9-bis[4-(4-amino-2-t-butylphenoxy)-3-ethylphenyl]fluorene, 9,9-bis[4-(4-amino-2-trifluoromethylphenoxy)-3-ethylphenyl]fluorene, 9,9-bis[4-(4-amino-2-methylphenoxy)-3-n-propylphenyl]fluorene, 9,9-bis[4-(4-amino-2-ethylphenoxy)-3-n-propylphenyl]fluorene, 9,9-bis[4-(4-amino-2-n-propylphenoxy)-3-n-propylphenyl]fluorene, 9,9-bis[4-(4-amino-2-i-propylphenoxy)-3-n-propylphenyl]fluorene, 9,9-bis[4-(4-amino-2-t-butylphenoxy)-3-n-propylphenyl]fluorene, 9,9-bis[4-(4-amino-2-trifluoromethylphenoxy)-3-n-propylphenyl]fluorene, 9,9-bis[4-(4-amino-2-methylphenoxy)-3-i-propylphenyl]fluorene, 9,9-bis[4-(4-amino-2-ethylphenoxy)-3-i-propylphenyl]fluorene, 9,9-bis[4-(4-amino-2-n-propylphenoxy)-3-i-propylphenyl]fluorene, 9,9-bis[4-(4-amino-2-i-propylphenoxy)-3-i-propylphenyl]fluorene, 9,9-bis[4-(4-amino-2-t-butylphenoxy)-3-i-propylphenyl]fluorene, 9,9-bis[4-(4-amino-2-trifluoromethylphenoxy)-3-i-propylphenyl]fluorene, 9,9-bis[4-(4-amino-2-methylphenoxy)-3-t-butylphenyl]fluorene, 9,9-bis[4-(4-amino-2-ethylphenoxy)-3-t-butylphenyl]fluorene, 9,9-bis[4-(4-amino-2-n-propylphenoxy)-3-t-butylphenyl]fluorene, 9,9-bis[4-(4-amino-2-i-propylphenoxy)-3-t-butylphenyl]fluorene, 9,9-bis[4-(4-amino-2-t-butylphenoxy)]-3-t-butylphenyl]fluorene, 9,9-bis[4-(4-amino-2-trifluoromethylphenoxy)-3-t-butylphenyl]fluorene, 9,9-bis[4-(4-amino-2-methylphenoxy)-3-trifluoromethylphenyl]fluorene, 9,9-bis[4-(4-amino-2-ethylphenoxy)-3-trifluoromethylphenyl]fluorene, 9,9-bis[4-(4-amino-2-n-propylphenoxy)-3-trifluoromethylphenyl]fluorene, 9,9-bis[4-(4-amino-2-i-propylphenoxy)-3-trifluoromethylphenyl]fluorene, 9,9-bis[4-(4-amino-2-t-butylphenoxy)-3-trifluoromethylphenyl]fluorene, 9,9-bis[4-(4-amino-2-trifluoromethylphenoxy)-3-trifluoromethylphenyl]fluorene, 9,9-bis[4-(4-amino-2-methylphenoxy)-3,5-dimethylphenyl]fluorene, 9,9-bis[4-(4-amino-2-ethylphenoxy)-3,5-dimethylphenyl]fluorene, 9,9-bis[4-(4-amino-2-n-propylphenoxy)-3,5-dimethylphenyl]fluorene, 9,9-bis[4-(4-amino-2-i-propylphenoxy)-3,5-dimethylphenyl]fluorene, 9,9-bis[4-(4-amino-2-t-butylphenoxy)-3,5-dimethylphenyl]fluorene, 9,9-bis[4-(4-amino-2-trifluoromethylphenoxy)-3,5-dimethylphenyl]fluorene, 9,9-bis[4-(4-amino-2-methylphenoxy)-3,5-diethylphenyl]fluorene, 9,9-bis[4-(4-amino-2-ethylphenoxy)-3,5-diethylphenyl]fluorene, 9,9-bis[4-(4-amino-2-n-propylphenoxy)-3,5-diethylphenyl]fluorene, 9,9-bis[4-(4-amino-2-i-propylphenoxy)-3,5-diethylphenyl]fluorene, 9,9-bis[4-(4-amino-2-t-butylphenoxy)-3,5-diethylphenyl]fluorene, 9,9-bis[4-(4-amino-2-trifluoromethylphenoxy)-3,5-diethylphenyl]fluorene, 9,9-bis[4-(4-amino-2-methylphenoxy)-3,5-di-n-propylphenyl]fluorene, 9,9-bis[4-(4-amino-2-ethylphenoxy)-3,5-di-n-propylphenyl]fluorene, 9,9-bis[4-(4-amino-2-n-propylphenoxy)-3,5-di-n-propylphenyl]fluorene, 9,9-bis[4-(4-amino-2-i-propylphenoxy)-3,5-di-n-propylphenyl]fluorene, 9,9-bis[4-(4-amino-2-t-butylphenoxy)-3,5-di-n-propylphenyl]fluorene, 9,9-bis[4-(4-amino-2-trifluoromethylphenoxy)-3,5-di-n-prop ylphenyl]fluorene, 9,9-bis[4-(4-amino-2-methylphenoxy)-3,5-di-i-propylphenyl]fluorene, 9,9-bis[4-(4-amino-2-ethylphenoxy)-3,5-di-i-propylphenyl]fluorene, 9,9-bis[4-(4-amino-2-n-propylphenoxy)-3,5-di-i-propylphenyl]fluorene, 9,9-bis[4-(4-amino-2-i-propylphenoxy)-3,5-di-i-propylphenyl]fluorene, 9,9-bis[4-(4-amino-2-t-butylphenoxy)-3,5-di-i-propylphenyl]fluorene, 9,9-bis[4-(4-amino-2-trifluoromethylphenoxy)-3,5-di-i-prop ylphenyl]fluorene, 9,9-bis[4-(4-amino-2-methylphenoxy)-3,5-di-t-butylphenyl]fluorene, 9,9-bis[4-(4-amino-2-ethylphenoxy)-3,5-di-t-butylphenyl]fluorene, 9,9-bis[4-(4-amino-2-n-propylphenoxy)-3,5-di-t-butylphenyl]fluorene, 9,9-bis[4-(4-amino-2-i-propylphenoxy)-3,5-di-t-butylphenyl]fluorene, 9,9-bis[4-(4-amino-2-t-butylphenoxy)-3,5-di-t-butylphenyl]fluorene, 9,9-bis[4-(4-amino-2-trifluoromethylphenoxy)-3,5-di-t-butylphenyl]fluorene, 9,9-bis[4-(4-amino-2-methylphenoxy)-3,5-di(trifluoromethyl)phenyl]fluorene, 9,9-bis[4-(4-amino-2-ethylphenoxy)-3,5-di(trifluoromethyl)phenyl]fluorene, 9,9-bis[4-(4-amino-2-n-propylphenoxy)-3,5-di(trifluoromethyl)phenyl]fluorene, 9,9-bis[4-(4-amino-2-i-propylphenoxy)-3,5-di(trifluoromethyl)phenyl]fluorene, 9,9-bis[4-(4-amino-2-t-butylphenoxy)-3,5-di(trifluoromethyl) phenyl]fluorene, 9,9-bis[4-(4-amino-2-trifluoromethylphenoxy)-3,5-di(trifluoromethyl)phenyl]fluorene, 9,9-bis[4-(2-amino-3-methylphenoxy)-3-methylphenyl]fluorene, 9,9-bis[4-(2-amino-4-methylphenoxy)-3-methylphenyl]fluorene, 9,9-bis[4-(2-amino-5-methylphenoxy)-3-methylphenyl]fluorene, 9,9-bis[4-(2-amino-6-methylphenoxy)-3-methylphenyl]fluorene, 9,9-bis[4-(2-amino-3-trifluoromethylphenoxy)-3-methylphenyl]fluorene, 9,9-bis[4-(2-amino-4-trifluoromethylphenoxy)-3-methylphenyl]fluorene, 9,9-bis[4-(2-amino-5-trifluoromethylphenoxy)-3-methylphenyl]fluorene, 9,9-bis[4-(2-amino-6-trifluoromethylphenoxy)-3-methylphenyl]fluorene, 9,9-bis[4-(3-amino-2-methylphenoxy)-3-methylphenyl]fluorene, 9,9-bis[4-(3-amino-4-methylphenoxy)-3-methylphenyl]fluorene, 9,9-bis[4-(3-amino-5-methylphenoxy)-3-methylphenyl]fluorene, 9,9-bis[4-(3-amino-6-methylphenoxy)-3-methylphenyl]fluorene, 9,9-bis[4-(3-amino-2-ethylphenoxy)-3-methylphenyl]fluorene, 9,9-bis[4-(3-amino-4-ethylphenoxy)-3-methylphenyl]fluorene, 9,9-bis[4-(3-amino-5-ethylphenoxy)-3-methylphenyl]fluorene, 9,9-bis[4-(3-amino-6-ethylphenoxy)-3-methylphenyl]fluorene, 9,9-bis[4-(3-amino-2-n-propylphenoxy)-3-methylphenyl]fluorene, 9,9-bis[4-(3-amino-4-n-propylphenoxy)-3-methylphenyl]fluorene, 9,9-bis[4-(3-amino-5-n-propylphenoxy)-3-methylphenyl]fluorene, 9,9-bis[4-(3-amino-6-n-propylphenoxy)-3-methylphenyl]fluorene, 9,9-bis[4-(3-amino-2-i-propylphenoxy)-3-methylphenyl]fluorene, 9,9-bis[4-(3-amino-4-i-propylphenoxy)-3-methylphenyl]fluorene, 9,9-bis[4-(3-amino-5-i-propylphenoxy)-3-methylphenyl]fluorene, 9,9-bis[4-(3-amino-6-i-propylphenoxy)-3-methylphenyl]fluorene, 9,9-bis[4-(3-amino-2-t-butylphenoxy)-3-methylphenyl]fluorene, 9,9-bis[4-(3-amino-4-t-butylphenoxy)-3-methylphenyl]fluorene, 9,9-bis[4-(3-amino-5-t-butylphenoxy)-3-methylphenyl]fluorene, 9,9-bis[4-(3-amino-6-t-butylphenoxy)-3-methylphenyl]fluorene, 9,9-bis[4-(3-amino-2-trifluoromethylphenoxy)-3-methylphenyl]fluorene, 9,9-bis[4-(3-amino-4-trifluoromethylphenoxy)-3-methylphenyl]fluorene, 9,9-bis[4-(3-amino-5-trifluoromethylphenoxy)-3-methylphenyl]fluorene, and 9,9-bis[4-(3-amino-6-trifluoromethylphenoxy)-3-methylphenyl]fluorene.

The diamine may contain a diamine other than the fluorene-based diamine as long as the effect of the particle-dispersed polyimide precursor solution according to the present exemplary embodiment is not impaired.

Examples of other diamines include compounds of aromatic diamines and aliphatic diamines that do not have a fluorene skeleton.

Here, the aromatic diamine that does not have a fluorene skeleton (hereinafter, may be simply referred to as "aromatic diamine") refers to a diamine excluding the fluorene-based diamine among the diamines having an aromatic ring.

Aliphatic diamine refers to a diamine in which two amino groups are directly bonded to an aliphatic hydrocarbon group.

Examples of other diamine compounds include aromatic diamines such as p-phenylenediamine, m-phenylenediamine, 4,4'-diaminodiphenylmethane, 4,4'-diaminodiphenylethane, 4,4'-diaminodiphenylether, 4,4'-diaminodiphenylsulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl) hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl) biphenyl, 2,2-bis[4-(4-aminophenoxy)phenyl] propane, 2,2-bis[4-(4-aminophenoxy)phenyl]hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenylene isopropylidene)bisaniline, 4,4'-(m-phenylene isopropylidene)bisaniline, 2,2'-bis[4-(4-amino-2-trifluoromethylphenoxy)phenyl]hexafluoropropane, 4,4'-bis[4-(4-amino-2-trifluoromethyl)phenoxy]-octafluorobiphenyl, and 1,1-methoxylylenediamine; aromatic diamines having two amino groups bonded to an aromatic ring and a hetero atom other than the nitrogen atom of the amino group such as diaminotetraphenylthiophene; and aliphatic diamines such as 1,3-propanediamine, tetramethylenediamine, pentamethylenediamine, octamethylenediamine, nonamethylenediamine, 4,4-diaminoheptamethylenediamine, 1,4-diaminocyclohexane, isophorondiamine, tetrahydrodicyclopentadienirange Alibo diamines such as amines, hexahydro-4,7-methanoindanylenedimethylenediamine, tricyclo[6,2,1, 0$^{2.7}$]-undecylenedimethyldiamine, and 4,4'-methylenebis (cyclohexylamine).

The diamine may be used alone or in combination of two or more kinds thereof.

The polyimide precursor is, for example, preferably a polyimide precursor having a unit represented by the following Formula (I):

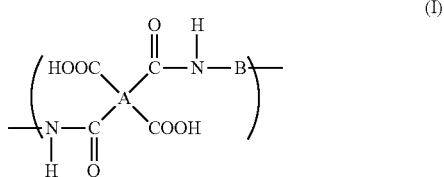

(In Formula (I), A represents a tetravalent organic group, and B represents a divalent organic group represented by the following Formula (B1) derived from the fluorene-based diamine.)

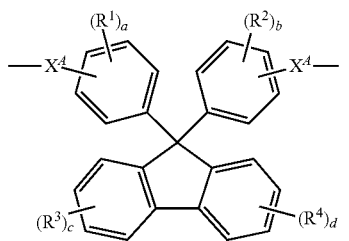

In addition, $R^1$ to $R^4$, a to d, and $X^A$ shown in the Formula (B1) will be described later.

Since the polyimide precursor has a unit represented by the above Formula (I), a particle-dispersed polyimide precursor solution capable of providing a porous polyimide film having a lower dielectric constant can be easily obtained. The reason is presumed as follows.

The above Formula (I) has a divalent organic group represented by the above Formula (B1) derived from a fluorene-based diamine. The divalent organic group represented by the above Formula (B1) has a greatly sterically hindered structure called a cardo structure. Thus, the steric hindrance of the polyimide precursor becomes even greater. Therefore, the gap between the molecular chains of the polyimide precursor becomes larger. This makes it easier for the aqueous solvent to boil in the gaps between the molecular chains of the polyimide precursor in the production of the porous polyimide film. Thus, it becomes easier to obtain a porous polyimide film having communicating pores.

Thus, since the polyimide precursor has a unit represented by the above Formula (I), a particle-dispersed polyimide precursor solution capable of providing a porous polyimide film having a lower dielectric constant can be easily obtained.

Here, in the general Formula (I), the tetravalent organic group represented by A is a residue obtained by removing four carboxyl groups from the tetracarboxylic dianhydride used as a raw material.

On the other hand, the divalent organic group represented by B is a residue obtained by removing two amino groups from the fluorene-based diamine used as a raw material.

That is, the polyimide precursor having a unit represented by the general Formula (I) is a polymer of tetracarboxylic dianhydride and a diamine containing a fluorene-based diamine having a fluorene skeleton.

In the Formula (B1), $R^1$ to $R^4$ each independently represent a halogeno group, an alkyl group, an alkoxy group, or an aryl group.

Examples of the halogeno group of $R^1$ to $R^4$ include chlorine, bromine, and iodine.

Examples of the alkyl group of $R^1$ to $R^4$ include a substituted or unsubstituted alkyl group. For example, the unsubstituted alkyl group preferably has 1 or more and 10 or less carbon atoms, and more preferably 1 or more and 4 or less carbon atoms. Specific examples of the unsubstituted alkyl group include a methyl group, an ethyl group, an i-propyl group, an n-propyl group, and a t-butyl group. In a case where the alkyl group has a substituent, the substituent may be an aryl group (for example, an aryl group having 6 or more and 30 or less carbon atoms), a halogeno group, a hydroxyl group, a carboxy group, an alkoxy group (for example, an alkoxy group having 1 or more and 15 or less carbon atoms), a cyano group, a nitro group, an amino group, and a sulfo group.

Examples of the alkoxy group of $R^1$ to $R^4$ include an alkoxy group having 1 or more and 15 or less carbon atoms. The number of carbon atoms of the alkoxy group is, for example, preferably 1 or more and 12 or less, and more preferably 1 or more and 10 or less. Specific examples of the alkoxy group include a methoxy group, an ethoxy group, a propoxy group, a butoxy group, a pentyloxy group, a hexyloxy group, a heptyloxy group, an octyloxy group, a nonyloxy group, a decyloxy group, an undecyloxy group, and a dodecyloxy group, a tridecyloxy group, a tetradecyloxy group, a pentadecyloxy group, a hexadecyloxy group, a heptadecyloxy group, and an octadecyloxy group.

Examples of the aryl group of $R^1$ to $R^4$ include a substituted or unsubstituted aryl group. The number of carbon atoms of the unsubstituted aryl group is, for example, preferably 6 or more and 30 or less, more preferably 6 or more and 14 or less, and still more preferably 6 or more and 10 or less. Specific examples of the unsubstituted aryl group include a phenyl group and a biphenyl. In a case where the aryl group has a substituent, the substituent may be an alkyl group (for example, an alkyl group having 1 or more and 10 or less carbon atoms), an aryl group (for example, an aryl group having 6 or more and 30 or less carbon atoms), a halogeno group, a hydroxyl group, a carboxy group, an alkoxy group (for example, an alkoxy group having 1 or more and 15 or less carbon atoms), a cyano group, a nitro group, an amino group, and a sulfo group.

Each of a to d independently represents an integer of 0 to 4, and is preferably an integer of 0 to 2, for example.

$X^A$ represents a single bond or a divalent organic group. Examples of the divalent organic group as $X^A$ include an alkylene group, —O-(ether group), —OC=O— (ester group), and —O—Ar—. Here, Ar represents an arylene group.

Examples of the alkylene group of $X^A$ include linear or branched alkylene group having 1 or more and 20 or less carbon atoms. The number of carbon atoms of the alkylene group $X^A$ is, for example, preferably 1 or more and 15 or less, and more preferably 1 or more and 12 or less. Specific examples of the alkylene group include an ethylene group, a propylene group, a trimethylene group, a butylene group, and a tetramethylene group.

Examples of the arylene group as Ar include a substituted or unsubstituted arylene group. The number of carbon atoms of the unsubstituted arylene group is, for example, preferably 6 or more and 30 or less, more preferably 6 or more and 14 or less, and still more preferably 6 or more and 10 or less. Specific examples of the unsubstituted arylene group include a phenylene group, a naphthalene-diyl group, an anthracene-diyl group, a biphenyl-diyl group, and a terphenyl-diyl group. In a case where the arylene group has a substituent, the substituent includes the same as the above-mentioned substituent in a case where the aryl group has a substituent.

The total content of the structure derived from a fluorene-based diamine (that is, the divalent organic group represented by the above Formula (B1) derived from a fluorene-based diamine) is, for example, preferably 40% by mass or more and 60% by mass or less with respect to the total amount of the polyimide precursor.

By setting the total content of the structure derived from a fluorene-based diamine within the above numerical range, the polyimide precursor contains a large amount of the fluorene skeleton. Therefore, the steric hindrance of the polyimide precursor tends to become greater. Therefore, the aqueous solvent is more likely to boil in the gaps between the polyimide precursors, so that a porous polyimide film containing a large number of structures in which the pores communicate with each other can be more easily obtained. That is, a particle-dispersed polyimide precursor solution capable of providing a porous polyimide film having a lower dielectric constant can be more easily obtained.

From the viewpoint of making it easier to obtain a particle-dispersed polyimide precursor solution capable of providing a porous polyimide film having a lower dielectric constant, the total content of the structure derived from the fluorene-based diamine is, for example, more preferably 45% by mass or more and 60% by mass or less, and still more preferably 48% by mass or more and 60% by mass or less, with respect to the total amount of the polyimide precursor.

Here, the total content of the structure derived from the fluorene-based diamine is measured as follows.

First, the particles are separated from the particle-dispersed polyimide precursor solution to be measured. Next, methanol is added to the polyimide precursor solution from which the particles have been separated to obtain a reprecipitation of the polyimide precursor. The reprecipitate is placed in a pressure-resistant container, an aqueous solution of 1N sodium hydroxide is added thereto, and the mixture is treated at 100° C. for 2 hours to obtain a hydrolyzed product of the polyimide precursor.

Next, the hydrolyzed product is extracted with chloroform and analyzed from the concentrated solution of the chloroform phase by infrared spectroscopy, nuclear magnetic resonance spectroscopy, and gas chromatography to measure the structure and amount of diamine.

Further, the aqueous phase, which is the chloroform-insoluble phase of the hydrolyzed product, is neutralized and freeze-dried to obtain a dried solid content. The dried solid content is then subjected to extraction with methanol, and the lysate therefrom is analyzed by infrared spectroscopy, nuclear magnetic resonance spectroscopy, and gas chromatography to measure the structure and amount of tetracarboxylic dianhydride.

From this measurement result, the total content of the structure derived from the fluorene-based diamine contained in the particle-dispersed polyimide precursor solution and the total amount of the polyimide precursor are calculated, and the total content of the structure derived from the fluorene-based diamine to the total amount of the polyimide precursor is calculated.

The total content of the structure derived from the fluorene-based diamine (that is, the divalent organic group represented by the above Formula (B1) derived from the fluorene-based diamine) is, for example, preferably 1% by mass or more and 50% by mass or less with respect to the particles.

By setting the total content of the structure derived from the fluorene-based diamine with respect to the particles to be within the above numerical range, in a case where a coating film is formed by applying a particle-dispersed polyimide precursor solution in the production of a porous polyimide film, the amount of fluorene skeleton in the gap between particles is increased. Therefore, the pores generated by boiling the aqueous solvent are more likely to be generated in the gaps between the particles, and the structure in which the pores communicate with each other is more likely to be formed.

Thus, by setting the volume-average particle size of the particles within the above range, a particle-dispersed polyimide precursor solution capable of providing a porous polyimide film having a lower dielectric constant can be more easily obtained.

The total content of the structure derived from the fluorene-based diamine is, for example, more preferably 3% by mass or more and 48% by mass or less, and still more preferably 5% by mass or more and 46% by mass or less with respect to the particles.

The number-average molecular weight of the polyimide precursor may be, for example, 1000 or more and 150,000 or less, more preferably 5000 or more and 130,000 or less, and still more preferably 10,000 or more and 100,000 or less.

In a case where the number-average molecular weight of the polyimide precursor is within the above range, the decrease in the solubility of the polyimide precursor in the solvent is suppressed, and the film-forming property is easily ensured.

The number-average molecular weight of the polyimide precursor is measured by a gel permeation chromatography (GPC) method under the following measurement conditions.

Column: Tosoh TSK gel α-M (7.8 mm I.D×30 cm)
Eluent: DMF (dimethylformamide)/30 mM LiBr/60 mM phosphoric acid
Flow rate: 0.6 mL/min
Injection volume: 60 μL
Detector: RI (differential refractive index detector)

The content (concentration) of the polyimide precursor may be, for example, 0.1% by mass or more and 40% by mass or less, preferably 0.5% by mass or more and 25% by mass or less, and more preferably 1% by mass or more and 20% by mass or less with respect to the total particle-dispersed polyimide precursor solution.

Particles

Examples of the particles include resin particles and inorganic particles.

The particles used are particles which are insoluble in the particle-dispersed polyimide precursor solution.

In the present exemplary embodiment, the term "insoluble" also includes the case where the target substance dissolves in the range of 3% by mass or less with respect to the target liquid at 25° C.

The particles may be used alone or in combination of two or more kinds thereof.

The particles are preferably, for example, resin particles.

The polyimide precursor contains a fluorene skeleton. Since the fluorene skeleton contains a phenyl group, electronic interaction between the phenyl group in the fluorene skeleton and the resin skeleton (for example, styrene skeleton) in the resin particles (for example, n-n interaction) is expected. It is considered that since the phenyl group of the fluorene skeleton and the resin skeleton in the resin particles approach each other by interaction, the resin particles are arranged along the polyimide precursor skeleton. In a case where the resin particles are arranged along the polyimide precursor skeleton, the tendency of the resin particles present in the polyimide precursor solution to approach and collide with each other increases. As a result, a continuous structure in which particles present in the polyimide precursor solution are connected to each other is easily obtained. As a result, it is considered that the pores obtained in a case where the resin particles are removed from the system during the production of the porous polyimide film also have a continuous structure in which the pores are connected. Thus, by using resin particles as the particles, a particle-dispersed polyimide precursor solution capable of providing a porous polyimide film having a lower dielectric constant can be more easily obtained.

The resin particles are not particularly limited, but are resin particles consisting of a resin other than polyimide. Examples thereof include resin particles obtained by polycondensation of polymerizable monomers such as polyester resins and urethane resins, and resin particles obtained by radical polymerization of polymerizable monomers such as vinyl resins, olefin resins, and fluororesins. Examples of the resin particles obtained by radical polymerization include resin particles of (meth)acrylic resin, (meth)acrylate resin, styrene/(meth)acrylic resin, polystyrene resin, and polyethylene resin.

Among these, the resin particles is preferably at least one selected from the group consisting of, for example, (meth)acrylic resin, (meth)acrylate resin, styrene/(meth)acrylic resin, and polystyrene resin.

In addition, in the present exemplary embodiment, "(meth)acrylic" means that both "acrylic" and "methacryl" are included.

Further, the resin particles may or may not be crosslinked. In the imidization step of the polyimide precursors, for example, non-crosslinked resin particles are preferred in view of effectively contributing to relaxation of residual stress. Further, the particle-dispersed polyimide precursor solution more preferably contains, for example, vinyl resin particles obtained by emulsion polymerization as resin particles in order to simplify the step of producing the particle-dispersed polyimide precursor solution.

In a case where the resin particles are vinyl resin particles, the resin particles are obtained by polymerizing a monomer. Examples of the vinyl resin monomer include the following monomers. Examples thereof include: styrenes having a styrene skeleton such as styrene, alkyl-substituted styrene (for example, α-methylstyrene, 2-methylstyrene, 3-methylstyrene, 4-methylstyrene, 2-ethylstyrene, 3-ethylstyrene, 4-ethylstyrene), halogen-substituted styrene (for example, 2-chlorostyrene, 3-chlorostyrene, 4-chlorostyrene), and vinylnaphthalene; esters having a vinyl group such as methyl (meth)acrylate, ethyl (meth)acrylate, n-propyl (meth)acrylate, n-butyl (meth)acrylate, lauryl (meth)acrylate, 2-ethylhexyl (meth)acrylate, and trimethylolpropane trimethacrylate (TMPTMA); vinyl nitriles such as acrylonitrile and methacrylonitrile; vinyl ethers such as vinyl methyl ether and vinyl isobutyl ether; vinyl ketones such as vinyl methyl ketone, vinyl ethyl ketone, and vinyl isopropenyl ketone; acids such as (meth)acrylic acid, maleic acid, cinnamic acid, fumaric acid, and vinyl sulfonic acid; bases such as ethyleneimine, vinylpyridine, and vinylamine; and vinyl resin units obtained by polymerizing the monomers.

As other monomers, monofunctional monomers such as vinyl acetate, difunctional monomers such as ethylene glycol dimethacrylate, nonane diacrylate, and decanediol diacrylate, and polyfunctional monomers such as trimethylolpropane triacrylate and trimethylolpropane trimethacrylate may be used in combination.

Further, the vinyl resin may be a resin using these monomers alone or a resin which is a copolymer using two or more monomers.

The resin particles preferably have an acidic group on the surface, for example, in that the dispersibility is improved and the generation of pinholes is suppressed. It is considered that the acidic group present on the surface of the resin particles functions as a dispersant for the resin particles by forming a salt with a base such as an organic amine compound used for dissolving the polyimide precursor in an aqueous solvent. Therefore, it is considered that the dispersibility of the resin particles in the particle-dispersed polyimide precursor solution is improved.

The acidic group contained on the surface of the resin particles is not particularly limited, but may be at least one selected from the group consisting of a carboxy group, a sulfonic acid group, and a phenolic hydroxyl group. Among these, for example, a carboxy group is preferable.

The monomer for having an acidic group on the surface of the resin particle is not particularly limited as long as the monomer is a monomer having an acidic group. Examples thereof include a monomer having a carboxy group, a monomer having a sulfonic acid group, a monomer having a phenolic hydroxyl group, and salts thereof.

Specific examples thereof include a monomer having a sulfonic acid group such as p-styrene sulfonic acid and 4-vinylbenzene sulfonic acid; a monomer having phenolic hydroxyl groups such as 4-vinyldihydrosilicate, 4-vinylphenol, and 4-hydroxy-3-methoxy-1-propenylbenzene; a monomer having a carboxy group such as acrylic acid, crotonic acid, methacrylic acid, 3-methylcrotonic acid, fumaric acid, maleic acid, 2-methylisocrotonic acid, 2,4-hexadiendioic acid, 2-pentenoic acid, sorbic acid, citraconic acid, 2-hexenoic acid, and monoethyl fumarate; and salts thereof. These monomers having an acidic group may mixed with the monomer having no acidic group and polymerized, or the monomer having no acidic group may be polymerized and granulated and then the monomer having an acidic group on the surface of the particles may be polymerized therewith. In addition, these monomers may be used alone or in combination of two or more.

Among these, preferred are, for example, monomers having a carboxy group, such as acrylic acid, crotonic acid, methacrylic acid, 3-methylcrotonic acid, fumaric acid, maleic acid, 2-methylisocrotonic acid, 2,4-hexadiendioic acid, 2-pentenoic acid, sorbic acid, citraconic acid, 2-hexenoic acid, monoethyl fumarate, and salts thereof. The monomer having a carboxy group may be used alone or in combination of two or more kinds thereof.

That is, the resin particles having an acidic group on the surface preferably has, for example, a skeleton derived from at least one monomer having a carboxy group selected from the group consisting of acrylic acid, crotonic acid, methacrylic acid, 3-methylcrotonic acid, fumaric acid, maleic acid, 2-methylisocrotonic acid, 2,4-hexadiendioic acid, 2-pentenoic acid, sorbic acid, citraconic acid, 2-hexenoic acid, monoethyl fumarate, and salts thereof.

In a case where a monomer having an acidic group and a monomer having no acidic group are mixed and polymerized, the amount of the monomer having an acidic group is not particularly limited, but in a case where the amount of the monomer having an acidic group is too small, the dispersibility of the resin particles in the particle-dispersed polyimide precursor solution may be reduced, and in a case where the amount of the monomer having an acidic group is too large, aggregates of polymer may be generated in emulsion polymerization. Therefore, the monomer having an acidic group is, for example, preferably 0.3% by mass or more and 20% by mass or less, more preferably 0.5% by mass or more and 15% by mass or less, and particularly preferably 0.7% by mass or more and 10% by mass or less, with respect to the total monomer.

On the other hand, in a case where a monomer having no acidic group is subjected to emulsion polymerization and then a monomer having an acidic group is further added and polymerized thereto, the amount of the monomer having an acidic group is preferably, for example, 0.01% by mass or more and 10% by mass or less, more preferably 0.05% by mass or more and 7% by mass or less, and particularly preferably 0.07% by mass or more and 5% by mass or less of the total monomer, from the same viewpoint as described above.

As described above, for example, it is preferable that the resin particles are not crosslinked, but in a case where a crosslinking agent is used as at least a part of the monomer components in crosslinking the resin particles, the proportion of the crosslinking agent in the total monomer components is preferably, for example, 0% by mass or more and 20% by mass or less, more preferably 0% by mass or more and 5% by mass or less, and particularly preferably 0% by mass.

In a case where the monomer used for the resin forming the vinyl resin particle contains styrene, for example, the proportion of styrene in the total monomer component is preferably 20% by mass or more and 100% by mass or less, and still more preferably 40% by mass or more and 100% by mass or less.

The resin particles may be obtained by polymerizing a monomer having an acidic group on the surface of a commercially available product. Specific examples of the crosslinked resin particles include crosslinked polymethyl methacrylate (MBX-series, manufactured by Sekisui Kasei Kogyo Co., Ltd.), crosslinked polystyrene (SBX-series, manufactured by Sekisui Kasei Kogyo Co., Ltd.), and copolymerized crosslinked resin particles of methyl methacrylate and styrene (MSX-series, manufactured by Sekisui Kasei Kogyo Co., Ltd.).

Examples of the non-crosslinked resin particles include polymethyl methacrylate (MB-series, manufactured by Sekisui Kasei Kogyo Co., Ltd.), (meth)acrylate/styrene copolymer (FS-series: manufactured by Nippon Paint Co., Ltd.).

Specific examples of the inorganic particles include silica particles, titanium oxide particles, and aluminum oxide particles.

The silica particles may be sol-gel silica obtained by the sol-gel method or fumed silica obtained by the gas phase method. Further, the silica particles used may be synthesized or commercially available products may be used. Furthermore, the silica particles may be in an aqueous solvent dispersion (for example, Snowtex (registered trademark) series, manufactured by Nissan Chemical Industries, Ltd.) or may be a dry powder (for example, Aerosil series, manufactured by Evonik Industries, Inc.). From the viewpoint of dispersibility, for example, it is preferable to use an aqueous dispersion for the silica particles.

Further, the inorganic particles may also contain particulate materials such as silica powder, alumina powder, barium sulfate powder, titanium oxide powder, mica, and talc, which are added to improve the mechanical strength.

The volume-average particle size of the particles is preferably 0.1 µm or more and 1 µm or less, for example.

By setting the volume-average particle size of the particles within the above range, in a case where a coating film is formed by applying a particle-dispersed polyimide precursor solution in the production of a porous polyimide film, the gaps between the particles become appropriately large, and the fluorene skeleton of the polyimide precursor easily enters the gaps between the particles. Therefore, the pores generated by boiling the aqueous solvent are more likely to be generated in the gaps between the particles, and the structure in which the pores communicate with each other is more likely to be formed.

Thus, by setting the volume-average particle size of the particles within the above range, a particle-dispersed polyimide precursor solution capable of providing a porous polyimide film having a lower dielectric constant can be more easily obtained.

From the viewpoint of making it easier to obtain a particle-dispersed polyimide precursor solution capable of providing a porous polyimide film having a lower dielectric constant, the volume-average particle size of the particles is, for example, more preferably 0.25 µm or more and 0.98 µm or less, and more preferably 0.25 µm or more and 0.95 µm or less.

The volume particle size distribution index (GSDv) of the particles is, for example, preferably 1.30 or less, more preferably 1.25 or less, and most preferably 1.20 or less.

The volume-average particle size of the particles is measured by using the particle size distribution obtained by the measurement of the laser diffraction type particle size distribution measurement apparatus (For example, Coulter Counter LS 13, described above, manufactured by Beckman Coulter, Inc.), subtracting the cumulative distribution for the divided particle size range (Channel) from the small particle size side with respect to the volume, and using the particle size which becomes the cumulative 50% for all particles as the volume-average particle size D50v.

Then, the volume particle size distribution index of the particles is calculated as $(D84v/D16v)^{1/2}$ from the particle size distribution of the particles in the particle-dispersed polyimide precursor solution. In the volume cumulative distribution drawn from the small diameter side of the volume of the particles, the particle size with a cumulative total of 16% is defined as the volume particle size D16v, and the particle size with a cumulative total 50% is defined as the volume-average particle size D50v.

The content of the particles is, for example, preferably 30% by mass or more and 85% by mass or less with respect to the total amount of the polyimide precursor and the particles.

By setting the particle content within the above range, in a case where a coating film is formed by applying a particle-dispersed polyimide precursor solution in the production of a porous polyimide film, the resin particles are likely to be present on the entire coating film. Therefore, the pores obtained by removing the resin particles are likely to be present on the entire film, and it is easier to form the structure in which the pores communicate with each other.

Thus, by using resin particles as the particles, a particle-dispersed polyimide precursor solution capable of providing a porous polyimide film having a lower dielectric constant can be more easily obtained.

From the viewpoint of making it easier to obtain a particle-dispersed polyimide precursor solution capable of providing a porous polyimide film having a lower dielectric constant can be obtained, the content of the particles is, for example, more preferably 35% by mass or more and 80% by mass or less, more preferably 40% by mass or more and 80% by mass or less, based on the total amount of the polyimide precursor and the particles.

Aqueous Solvent

As the aqueous solvent, the aqueous solvent in the resin particle and inorganic particle dispersion used for preparing the resin particle and inorganic particle dispersion in a case where the tetracarboxylic dianhydride and the diamine compound are polymerized in the resin particle and the inorganic particle dispersion may be used as is.

In a case where the tetracarboxylic dianhydride and the diamine compound are polymerized, an aqueous solvent may be prepared so as to be appropriate for the polymerization.

The aqueous solvent is an aqueous solvent containing water.

Examples of water include distilled water, ion-exchanged water, ultrafiltered water, and pure water.

The content of water is, for example, preferably 50% by mass or more with respect to the total amount of the aqueous solvent.

By setting the water content within the above numerical range, the boiling point of the aqueous solvent is further lowered. Therefore, the aqueous solvent is more likely to boil in the gaps between the polyimide precursors. As a result, a larger number of pores formed by volatilization of the aqueous solvent are formed, and the structure in which the pores communicate with each other is more easily formed.

Thus, by setting the content of water within the above numerical range, a particle-dispersed polyimide precursor solution capable of providing a porous polyimide film having a lower dielectric constant can be more easily obtained.

The content of water is, for example, more preferably 70% by mass or more and 100% by mass or less, and still more preferably 80% by mass or more and 100% by mass or less, with respect to the total amount of the aqueous solvent.

The aqueous solvent may contain a solvent other than water.

The solvent other than water is preferably water-soluble, for example. Here, water-soluble means that at 25° C., the target substance dissolves in water by 1% by mass or more.

Examples of solvents other than water include a water-soluble organic solvent and an aprotonic polar solvent.

From the viewpoint that a particle-dispersed polyimide precursor solution capable of providing a porous polyimide film having a lower dielectric constant can be more easily obtained, the solvent other than water is preferably, for example, an aprotonic polar solvent.

Examples of the water-soluble organic solvent include a water-soluble ether-based solvent, a water-soluble ketone-based solvent, and a water-soluble alcohol-based solvent.

The water-soluble ether-based solvent is a water-soluble solvent having an ether bond in one molecule.

Examples of the water-soluble ether-based solvent include tetrahydrofuran (THF), dioxane, trioxane, 1,2-dimethoxyethane, diethylene glycol dimethyl ether, and diethylene glycol diethyl ether. Among these, the water-soluble ether-based solvent is preferably tetrahydrofuran or dioxane.

The water-soluble ketone-based solvent is a water-soluble solvent having a ketone group in one molecule. Examples of the water-soluble ketone-based solvent include acetone, methyl ethyl ketone, and cyclohexanone. Among these, the water-soluble ketone-based solvent is preferably acetone.

The water-soluble alcohol-based solvent is a water-soluble solvent having an alcoholic hydroxyl group in one molecule. Examples of the water-soluble alcohol-based solvent include methanol, ethanol, 1-propanol, 2-propanol, tert-butyl alcohol, ethylene glycol, ethylene glycol monoalkyl ether, propylene glycol, propylene glycol monoalkyl ether, diethylene glycol, diethylene glycol monoalkyl ether, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, and 1,2,6-hexanetriol. Among these, preferred as the water-soluble alcohol-based solvent are, for example, methanol, ethanol, 2-propanol, ethylene glycol, ethylene glycol monoalkyl ether, propylene glycol, propylene glycol monoalkyl ether, diethylene glycol, and diethylene glycol monoalkyl ether.

Examples of the aprotonic polar solvent include a solvent having a boiling point of 150° C. or higher and 300° C. or lower and a dipole moment of 3.0 D or higher and 5.0 D or lower.

Specific examples of the aprotonic polar solvent include N-methyl-2-pyrrolidone (NMP), N,N-dimethylformamide (DMF), N,N-dimethylacetamide (DMAc), dimethyl sulfoxide (DMSO), hexamethylene phosphoramide (HMPA), N-methylcaprolactam, N-acetyl-2-pyrrolidone, 1,3-dimethyl-2-imidazolidinone (DMI), N,N'-dimethylpropyleneurea, tetramethylurea, trimethyl phosphate, and triethyl phosphate.

The aqueous solvent preferably contains, for example, an aprotonic polar solvent as the solvent other than water. Moreover, the content of the aprotonic polar solvent is, for example, preferably 1 part by mass or more and 50 parts by mass or less with respect to 100 parts by mass of the particles.

By using an aqueous solvent with such a compositional feature, a particle-dispersed polyimide precursor solution capable of providing a porous polyimide film having a lower dielectric constant can be more easily obtained. The reason is presumed to be as follows.

Since the aprotonic polar solvent has high compatibility with the particles, the particles are easily dissolved. By using the aqueous solvent as described above, the surface of the particles contained in the particle-dispersed polyimide precursor solution becomes sticky in the case of being dissolved. Therefore, in a case where the particle-dispersed polyimide precursor solution is applied to forma coating film during the production of the porous polyimide film, the particles tend to adhere to each other in the coating film. As a result, the pores obtained by removing the resin particles can easily communicate with each other. Therefore, the obtained porous polyimide film tends to contain a lot of structures in which pores communicate.

Thus, by using resin particles as the particles, a particle-dispersed polyimide precursor solution capable of providing a porous polyimide film having a lower dielectric constant can be more easily obtained.

In a case where the aqueous solvent contains, for example, an aprotonic polar solvent as the solvent other than water, the content of the aprotonic polar solvent is more preferably 3 parts by mass or more and 45 parts by mass or less, and still more preferably 5 parts by mass or more and 45 parts by mass or less with respect to 100 parts by mass of the particles.

Organic Amine Compound

The particle-dispersed polyimide precursor solution preferably contains, for example, an organic amine compound.

Since the particle-dispersed polyimide precursor solution contains an organic amine compound, the solubility of the polyimide precursor in the solvent is easily increased, the film-forming property is easily improved, and the storage stability of the polyimide precursor solution is easily improved.

The organic amine compound is a compound which amine-chlorinates the polyimide precursor (its carboxy group) and enhances the solubility thereof in an aqueous solvent and also functions as an imidization accelerator. Specifically, the organic amine compound may be, for example, an amine compound having a molecular weight of 170 or less. The organic amine compound may be, for example, a compound other than diamine, which is a raw material of the polyimide precursor.

The action of amine-chlorinating a polyimide precursor (its carboxy group) of an organic amine to enhance its solubility in an aqueous solvent and the action of promoting imidization are enhanced in a case where the content of water contained in the aqueous solvent is 50% by mass or more with respect to the total aqueous solvent.

Therefore, it is preferable that the particle-dispersed polyimide precursor solution contains, for example, an organic amine compound, and the content of water is 50% by mass or more based on the total amount of the aqueous solvent.

The organic amine compound may be, for example, a water-soluble compound.

Examples of the organic amine compound include a primary amine compound, a secondary amine compound, and a tertiary amine compound.

Among these, the organic amine compound may be, for example, at least one selected from a secondary amine compound and a tertiary amine compound (particularly, a tertiary amine compound). In a case where a tertiary amine compound or a secondary amine compound is applied as the organic amine compound (particularly, the tertiary amine compound), the solubility of the polyimide precursor in the solvent is more easily increased, the film-forming property is easily improved, and the storage stability of the particle-dispersed polyimide precursor solution is more easily improved.

In addition to monovalent amine compounds, examples of organic amine compounds include divalent or higher polyvalent amine compounds. In a case where a polyvalent amine compound of divalent or higher is applied, a pseudo-crosslinked structure is easily formed between the molecules of the polyimide precursor, and the storage stability of the polyimide precursor solution is easily improved.

Examples of the primary amine compound include methylamine, ethylamine, n-propylamine, isopropylamine, 2-ethanolamine, and 2-amino-2-methyl-1-propanol.

Examples of the secondary amine compound include dimethylamine, 2-(methylamine) ethanol, 2-(ethylamine) ethanol, and morpholine.

Examples of the tertiary amine compound include 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, and 2-ethyl-4-methylimidazole.

From the viewpoint of pot life of the polyimide precursor solution and film thickness uniformity, for example, a tertiary amine compound is preferable. In this regard, the organic amine is, for example, more preferably at least one selected from the group consisting of 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, and N-ethylpiperidine.

Here, the organic amine compound is also preferably, for example, an amine compound having a heterocyclic structure containing nitrogen (particularly, a tertiary amine compound) from the viewpoint of film-forming property. Examples of the amine compound having a heterocyclic structure containing nitrogen (hereinafter referred to as "nitrogen-containing heterocyclic amine compound") include isoquinolins (amine compounds having an isoquinolin skeleton), pyridines (amine compounds having a pyridine skeleton), pyrimidines (amine compounds having a pyrimidine skeleton), pyrazines (amine compounds having a pyrazine skeleton), piperazins (amine compounds having a piperazin skeleton), triazines (amine compounds having a triazine skeleton), imidazoles (amine compounds having an imidazole skeleton), morpholine (amine compounds having a morpholin skeleton), polyaniline, polypyridine, and polyamine.

The nitrogen-containing heterocyclic amine compound is preferably, for example, at least one selected from the group consisting of morpholins, pyridines, piperidines, and imidazoles, and more preferably morpholins (amine compounds having a morpholin skeleton), from the viewpoint of film-forming property. Among these, preferred is, for example, at least one selected from the group consisting of N-methylmorpholine, N-methylpiperidine, pyridine, 1,2-dimethylimidazole, 2-ethyl-4-methylimidazole, and picoline, and still more preferably N-methylmorpholine.

Among these, the organic amine compound may be, for example, a compound having a boiling point of 60° C. or higher (for example, preferably 60° C. or higher and 200° C. or lower, and more preferably 70° C. or higher and 150° C. or lower). In a case where the boiling point of the organic amine compound is 60° C. or higher, the organic amine compound is suppressed from volatilizing from the polyimide precursor solution during storage, and the decrease in solubility of the polyimide precursor in the solvent is easily suppressed.

The organic amine compound may be, for example, contained in an amount of 50 mol % or more and 500 mol % or less, preferably 80 mol % or more and 250 mol % or less, more preferably 90 mol % or more and 200 mol % or less, with respect to the carboxy group (—COOH) of the polyimide precursor in the polyimide precursor solution.

In a case where the content of the organic amine compound is within the above range, the solubility of the polyimide precursor in the solvent is more easily increased, and the film-forming property is easily improved. Further, the storage stability of the polyimide precursor solution can be easily improved.

The above organic amine compounds may be used alone or in combination of two or more kinds thereof.

Other Additives

In the method for producing the polyimide precursor solution according to the present exemplary embodiment, the polyimide precursor solution may contain a catalyst for promoting the imidization reaction, a leveling material for improving the film forming quality, and the like.

The catalyst for promoting the imidization reaction used may be a dehydrating agent such as an acid anhydride, an acid catalyst such as a phenol derivative, a sulfonic acid derivative, a benzoic acid derivative, or the like.

Further, the polyimide precursor solution may contain, for example, a conductive material (conductive (for example, a volume resistivity of less than $10^7$ Ω·cm) or semiconductive (for example, a volume resistivity of $10^7$ Ω·cm or more and $10^{13}$ Ω·cm or less)) to be added to the polyimide precursor solution for imparting conductivity, as a material other than inorganic particles having a volume-average particle size of 0.001 μm or more and 0.2 μm or less, depending on the purpose of use.

Examples of the conductive agent include carbon black (for example, acidic carbon black having a pH of 5.0 or less); metals (for example, aluminum or nickel); metal oxides (for example, yttrium oxide, or tin oxide); ion conductive substances (for example, potassium titanate, or LiCl); and the like. These conductive materials may be used alone or in combination of two or more.

Method for Producing Porous Polyimide Film

Hereinafter, an example of a method for producing a porous polyimide film according to the present exemplary embodiment will be described.

The method for producing a porous polyimide film according to the present exemplary embodiment includes, for example, the following steps. A first step of applying a particle-dispersed polyimide precursor solution to form a coating film, and then drying the coating film to form a film containing the polyimide precursor and the particles.

A second step of heating the film to imidize the polyimide precursor to form a polyimide film, the second step including a process of removing the particles.

Figure 1B:
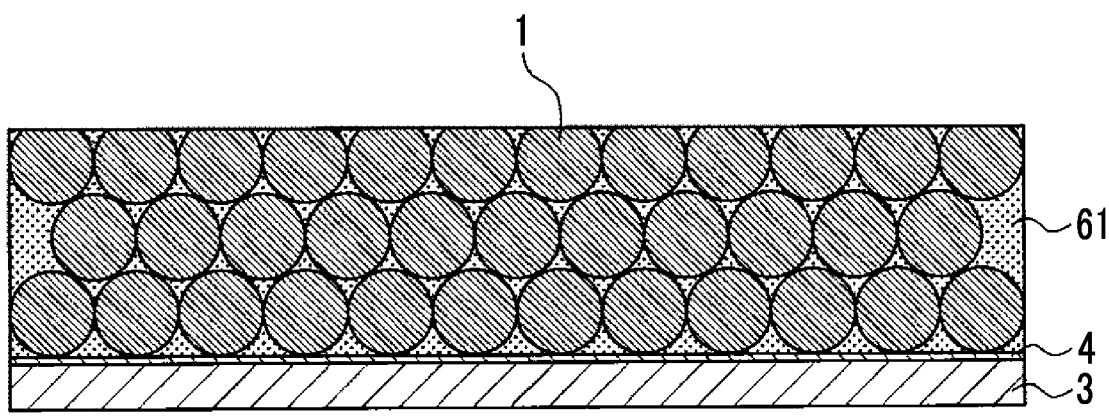
Figure 1C:
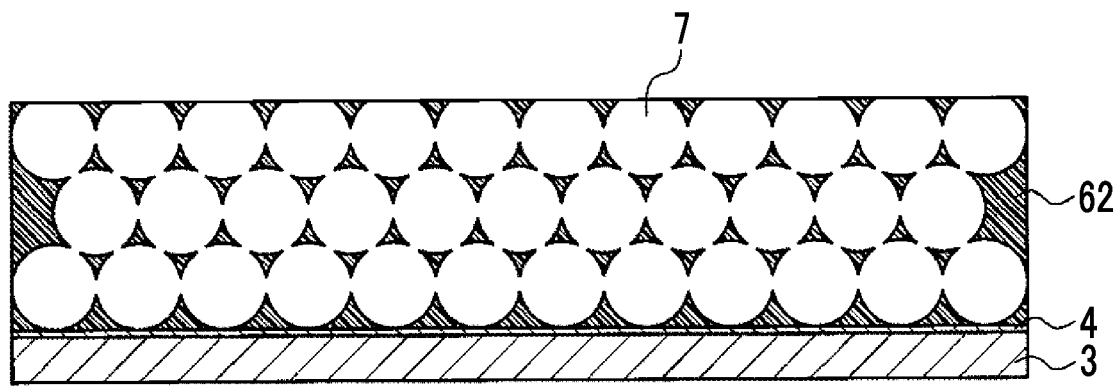

In the description of the production method, the same components are designated by the same reference numerals in FIGS. 1A, 1B, and 1C to be referred to. In the reference numerals in FIGS. 1A, 1B, and 1C, 3 represents a substrate, 4 represents a release layer, 7 represents pores, and 61 represents a porous polyimide film.

First Step

In the first step, first, a particle-dispersed polyimide precursor solution is prepared.

The method for preparing the particle-dispersed polyimide precursor solution will be described in detail below, but as an example, the method for preparing the particle-dispersed polyimide precursor solution containing resin particles as particles (resin particle-dispersed polyimide precursor solution) will be described.

Examples of the method for preparing the resin particle-dispersed polyimide precursor solution according to the present exemplary embodiment include the methods according to (i) and (ii) below.

(i) A method of preparing a polyimide precursor solution before dispersing resin particles, and then mixing and dispersing resin particles (powder or organic solvent dispersion).

(ii) A method for synthesizing a polyimide precursor in an organic solvent dispersion of resin particles (i) A method of preparing a polyimide precursor solution before dispersing resin particles, and then mixing and dispersing the resin particles.

First, examples thereof include a method in which the polyimide precursor solution before dispersing the resin particles is obtained by polymerizing tetracarboxylic dianhydride and diamine compounds in an organic solvent using a known method to produce a resin (polyimide precursor) so as to obtain a polyimide precursor solution before dispersing the resin particles.

Next, the resin particles described in the section of resin particles are mixed with the polyimide precursor solution before dispersing the obtained resin particles, and the mixture is stirred. Alternatively, the resin particles may be redispersed in an organic solvent that does not dissolve the resin particles (either alone or in a mixed solvent), and then mixed and stirred with the polyimide precursor solution.

The mixing, stirring, and dispersing methods are not particularly limited. Further, in order to improve the dispersibility of the resin particles, a known nonionic or ionic surfactant may be added.

(ii) A method for synthesizing a polyimide precursor in an organic solvent dispersion of resin particles First, a solution in which resin particles are dispersed in an organic solvent in which the resin particles are not dissolved and the polyimide precursor is dissolved is prepared. Next, in the solution, the tetracarboxylic dianhydride and the diamine compound are polymerized to generate a resin (polyimide precursor) to obtain an organic solvent solution of the resin particle-dispersed polyimide precursor.

The resin particle-dispersed polyimide precursor solution obtained by the above method is applied onto a substrate to form a coating film containing the polyimide precursor solution and particles. Then, the coating film formed on the substrate is dried to form a film containing the polyimide precursor and the particles.

The substrate on which the resin particle-dispersed polyimide precursor solution is applied is not particularly limited. Examples thereof include resin substrates such as polystyrene and polyethylene terephthalate; glass substrates; ceramic substrates; metal substrates such as iron and stainless steel (SUS); and composite material substrates in which these materials are combined. Further, as necessary, the substrate may be provided with a release layer by performing a release treatment with, for example, a silicone-based or fluorine-based release agent.

The method of applying the resin particle-dispersed polyimide precursor solution on the substrate is not particularly limited. Examples thereof include various methods such as a spray coating method, a spin coating method, a roll coating method, a bar coating method, a slit die coating method, and an inkjet coating method.

The coating amount of the resin particle-dispersed polyimide precursor solution for obtaining the coating film containing the polyimide precursor solution and the particles may be, for example, set to an amount capable of obtaining a predetermined film thickness.

After forming the coating film containing the polyimide precursor solution and the particles, the coating film is dried to forma film containing the polyimide precursor and particles. Specifically, a coating film containing a polyimide precursor solution and particles is dried by, for example, a method such as heat drying, natural drying, or vacuum drying to forma film. More specifically, the film is formed by drying the coating film so that the solvent remaining in the film is, for example, 50% or less, preferably 30% or less, with respect to the solid content of the film.

Second Step

The second step is a step of heating the film containing the polyimide precursor and particles obtained in the first step to imidize the polyimide precursor to form a polyimide film. The second step includes a process of removing the particles. A porous polyimide film is obtained through the process of removing particles.

Specifically, in the step of forming the polyimide film in the second step, the film containing the polyimide precursor and the particles obtained in the first step is heated to advance imidization, and further heated to form the polyimide film in which imidization has progressed. As the imidization progresses and the imidization rate increases, the particles become difficult to dissolve in an organic solvent.

Then, in the second step, a process of removing particles is performed. The particles may be removed in the process of heating the film to imidize the polyimide precursor, or may be removed from the polyimide film after the imidization is completed (after imidization).

In the present exemplary embodiment, the process of imidizing the polyimide precursor refers to a process of heating the film containing the polyimide precursor and the particles obtained in the first step to advance imidization to a state before the polyimide film is formed after imidization is completed.

The process of removing the particles is preferably performed in a case where the imidization rate of the polyimide precursor in the polyimide film is 10% or more in the process of imidizing the polyimide precursor, for example, in terms of particle removability and the like. In a case where the imidization rate is 10% or more, the morphology is easily maintained.

Next, the process of removing the particles will be described.

First, a process for removing resin particles will be described.

Examples of the process of removing the resin particles include a method of removing the resin particles by heating, a method of removing the resin particles with an organic solvent that dissolves the resin particles, and a method of removing the resin particles by decomposition with a laser or the like. Of these, for example, a method of removing the resin particles by heating and a method of removing the resin particles with an organic solvent that dissolves the resin particles are preferred.

In the method of removing by heating, for example, in the process of imidizing the polyimide precursor, the resin particles may be removed by decomposing the resin particles by heating for advancing the imidization. In this case, there is no operation of removing the resin particles with a solvent, which is advantageous for reducing the number of steps.

Examples of the method of removing the resin particles with an organic solvent that dissolves the resin particles include a method of contacting (for example, immersing in a solvent) the organic solvent in which the resin particles are dissolved to dissolve and remove the resin particles. In this state, for example, immersing in a solvent is preferable in that the dissolution efficiency of the resin particles is increased.

The organic solvent that dissolves the resin particles for removing the resin particles is not particularly limited as long as the organic solvent does not dissolve the polyimide film before imidization is completed and the polyimide film after imidization is completed, and the resin particles are soluble therein. Examples thereof include ethers such as tetrahydrofuran (THF); aromatics such as toluene; ketones such as acetone; and esters such as ethyl acetate.

In a case where the resin particles are removed and made porous by dissolution removal, it is preferable to dissolve the resin particles in a general-purpose solvent such as tetrahydrofuran, acetone, toluene, or ethyl acetate. Further, depending on the resin particles and the polyimide precursor used, water can also be used.

In a case where the resin particles are removed and made porous by heating, the resin particles are not decomposed at a drying temperature after coating, but are thermally decomposed at a temperature for imidizing the film of the polyimide precursor. From this point of view, the thermal decomposition start temperature of the resin particles may be, for example, 150° C. or higher and 320° C. or lower, preferably 180° C. or higher and 300° C. or lower, and more preferably 200° C. or higher and 280° C. or lower.

Here, a process of removing the inorganic particles in a case where the polyimide precursor solution contains the inorganic particles will be described.

Examples of the process of removing the inorganic particles include a method of removing the inorganic particles using a liquid (hereinafter, may be referred to as "particle removing solution") in which the inorganic particles are dissolved but the polyimide precursor or the polyimide is not dissolved. The particle removing solution is selected depending on the inorganic particles used. Examples of thereof include aqueous solutions of acids such as hydrofluoric acid, hydrochloric acid, hydrobromic acid, boric acid, perchloric acid, phosphoric acid, sulfuric acid, nitrate, acetic acid, trifluoroacetic acid, and citric acid; aqueous solutions of bases such as sodium hydroxide, potassium hydroxide, tetramethylammonium hydroxide, sodium carbonate, potassium carbonate, ammonia, and the above-mentioned organic amines. Further, depending on the inorganic particles and the polyimide precursor used, water alone can be used.

In the second step, the heating method for heating the film obtained in the first step to advance imidization to obtain a polyimide film is not particularly limited. For example, a method of heating in two stages can be mentioned. In the case of heating in two stages, the following heating conditions can be specifically mentioned.

As the heating condition of the first stage, for example, it is desirable that the temperature is such that the shape of the particles is maintained. Specifically, for example, the temperature may be in the range of 50° C. or higher and 150° C. or lower, and preferably in the range of 60° C. or higher and 140° C. or lower. The heating time may be in the range of 10 minutes or more and 60 minutes or less, for example. The higher the heating temperature, the shorter the heating time, which is preferable, for example.

Examples of the heating conditions in the second stage include heating at 150° C. or higher and 450° C. or lower (preferably 200° C. or higher and 430° C. or lower) for 20 minutes or longer and 120 minutes or shorter. By setting the heating conditions in this range, the imidization reaction can advance further and a polyimide film can be formed. During the heating reaction, for example, the temperature may be increased in stages or gradually at a constant rate before the final temperature of heating is reached.

The heating conditions are not limited to the above two-stage heating method, and for example, a one-stage heating method may be adopted. In the case of the method of heating in one stage, for example, the imidization may be completed only by the heating conditions shown in the above second stage.

In the second step, in terms of increasing the aperture ratio, for example, it is preferable to perform a process of exposing the particles so that the particles are exposed. In the second step, the process of exposing the particles is preferably performed, for example, in the process of imidizing the polyimide precursor, or after the imidization and before the process of removing the particles.

In this case, for example, in a case where a film is formed on a substrate using a particle-dispersed polyimide precursor solution, the particle-dispersed polyimide precursor solution is applied onto the substrate to form a coating film in which particles are embedded. Next, the coating film is dried to form a film containing a polyimide precursor and particles. The film formed by this method is in a state in which particles are embedded. The film may be subjected to a process of imidizing the polyimide precursor or a process of exposing the particles from the polyimide film after the imidization is completed (after imidization) before heating and removing the particles.

In the second step, the process of exposing the particles may be performed, for example, when the polyimide film is in the following state.

When the imidization rate of the polyimide precursor in the polyimide film is less than 10% (that is, in a state in which the polyimide film can be dissolved in the solvent), the process of exposing the particles embedded in the polyimide film includes a wiping process, a process of immersing the particles in a solvent, and the like. The solvent used at that time may be the same as or different from the solvent used for the particle-dispersed polyimide precursor solution of the present exemplary embodiment.

Further, examples thereof also include, in a case where the imidization rate of the polyimide precursor in the polyimide film is 10% or more (that is, in a state in which it is difficult to dissolve in water or an organic solvent), and in a case where the polyimide film has undergone imidization, a method of exposing the particles by mechanically cutting the particles with a tool such as a paper file, and in a case where the particles are resin particles, a method of exposing the resin particles by decomposing the particles with a laser or the like.

For example, in the case of mechanical cutting, a portion of the particles present in the upper region (that is, the region of the particles away from the substrate) of the particles embedded in the polyimide film are cut together with the polyimide film present in the upper region of the particles, and the cut particles are exposed from the surface of the polyimide film.

Thereafter, the particles are removed from the exposed polyimide film by the above-mentioned particle removing process. Then, a porous polyimide film from which particles have been removed is obtained (see FIGS. 1A, 1B, and 1C).

In the above description, the production step of the porous polyimide film subjected to the process of exposing the particles in the second step has been described, but in terms of increasing the aperture ratio, the process of exposing the particles may also be performed in the first step. In this case, in the first step, after obtaining the coating film, the particles may be exposed by performing the process of exposing in the process of drying to form the film. By performing the process of exposing the particles, the aperture ratio of the porous polyimide film can be increased.

For example, in the process of obtaining the coating film containing the polyimide precursor solution and the particles and then drying the coating film to form a film containing the polyimide precursor and particles, the film is in a state in which the polyimide precursor can be dissolved in a solvent as described above. When the film is in this state, the particles can be exposed by, for example, a wiping treatment or a process of immersing in a solvent. Specifically, the polyimide precursor solution existing in the region of the thickness or more of the particle layer is removed by, for example, wiping the polyimide precursor solution existing in the region of the thickness or more of the particle layer with a solvent to expose the particle layer. Then, the particles existing in the upper region of the particle layer (that is, the region on the side of the particle layer away from the substrate) are exposed from the surface of the film.

In the second step, the substrate for forming the above-mentioned film used in the first step may be peeled off when the film becomes dry, may be peeled off when the polyimide precursor in the polyimide film becomes difficult to dissolve in the organic solvent, and may be peeled off when imidization is completed and the film is formed.

Through the above steps, a porous polyimide film is obtained. Then, the porous polyimide film may be post-processed.

Here, the imidization rate of the polyimide precursor will be described.

Examples of the partially imidized polyimide precursor include precursors having a structure having a repeating unit represented by the following general Formula (V-1), the following general Formula (V-2), or the following general Formula (V-3).

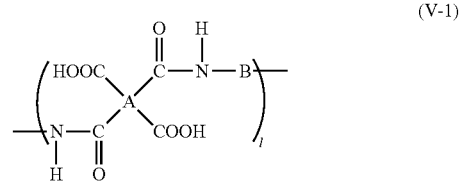

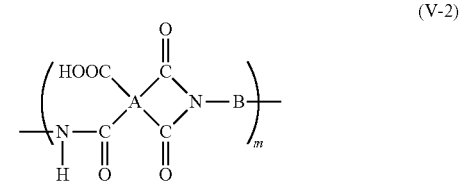

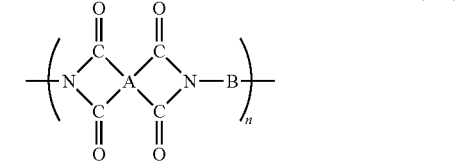

In the general Formula (V-1), the general Formula (V-2), and the general Formula (V-3), A and B are synonymous with A and B in the Formula (I). l represents an integer of 1 or more, and m and n each independently represent 0 or an integer of 1 or more.

The imidization rate of the polyimide precursor represents the ratio of the number of bonds closed (2n+m) to the total number of bonds (2l+2m+2n) in the bonds of the polyimide precursor (reaction portion of tetracarboxylic dianhydride and diamine compound). That is, the imidization rate of the polyimide precursor is represented by "(2n+m)/(2l+2m+2n)".

The imidization rate (value of "(2n+m)/(2l+2m+2n)") of the polyimide precursor is measured by the following method.

Measurement of Imidization Rate of Polyimide Precursor

Preparation of Polyimide Precursor Sample (i) The polyimide precursor composition to be measured is applied onto a silicon wafer in a film thickness range of 1 μm or more and 10 μm or less to prepare a coating film sample.

(ii) The coating film sample is immersed in tetrahydrofuran (THF) for 20 minutes to replace the solvent in the coating film sample with tetrahydrofuran (THF). The solvent to be immersed is not limited to THF, and can be selected from a solvent that does not dissolve the polyimide precursor and can be miscible with the solvent component contained in the polyimide precursor composition. Specifically, alcohol solvents such as methanol and ethanol, and ether compounds such as dioxane can be used.

(iii) The coating film sample is taken out from the THF, and $N_2$ gas is blown to the THF adhered to the surface of the coating film sample to remove the sample. Under a reduced pressure of 10 mmHg or less, the coating film sample is dried for 12 hours or more in the range of 5° C. or more and 25° C. or less to prepare a polyimide precursor sample.

Preparation of 100% Imidized Standard Sample (iv) In the same manner as in (i) above, the polyimide precursor composition to be measured is applied onto a silicon wafer to prepare a coating film sample.

(v) The coating film sample is heated at 380° C. for 60 minutes to perform an imidization reaction to prepare a 100% imidized standard sample.

Measurement and Analysis (vi) Using a Fourier transform infrared spectrophotometer (FT-730 manufactured by HORIBA, Ltd.), the infrared absorption spectra of the 100% imidized standard sample and the polyimide precursor sample are measured. The ratio I'(100) of the absorption peak derived from the imide bond near 1780 cm$^{-1}$ (Ab' (1780 cm$^{-1}$)) to the absorption peak derived from the aromatic ring near 1500 cm$^{-1}$ (Ab' (1500 cm$^{-1}$)) of the 100% imidized standard sample is determined.

(vii) Similarly, the polyimide precursor sample is measured, and the ratio I(x) of the absorption peak derived from the imide bond near 1780 cm$^{-1}$ (Ab' (1780 cm$^{-1}$)) to the absorption peak derived from the aromatic ring near 1500 cm$^{-1}$ (Ab' (1500 cm$^{-1}$)) is determined.

Then, the measured absorption peaks I'(100) and I(x) are used to calculate the imidization rate of the polyimide precursor based on the following Formula.

imidization rate of polyimide precursor=$I(x)/I'(100)$     Formula:

$I'(100)=(Ab'(1780\ cm^{-1}))/(Ab'(1500\ cm^{-1}))$     Formula:

$I(x)=(Ab(1780\ cm^{-1}))/(Ab(1500\ cm^{-1}))$     Formula:

The measurement of the imidization rate of this polyimide precursor is applied to the measurement of the imidization rate of the aromatic polyimide precursor. In the case of measuring the imidization rate of the aliphatic polyimide precursor, a peak derived from a structure that does not change before and after the imidization reaction is used as an internal standard peak instead of the absorption peak of the aromatic ring.

Porous Polyimide Film

Hereinafter, the porous polyimide film of the present exemplary embodiment will be described.

The porous polyimide film according to the present exemplary embodiment contains a polyimide obtained by imidizing a polyimide precursor consisting of a polymer of a tetracarboxylic dianhydride and a diamine containing a fluorene-based diamine having a fluorene skeleton, and has pores.

The porous polyimide film according to the present exemplary embodiment has a characteristic of low dielectric constant by having the above structure.

Here, as the polyimide precursor, for example, the polyimide precursor described in the above-mentioned section of the polyimide precursor is preferable.

As a method for producing the porous polyimide film, for example, the method described in the above-mentioned section of the method for producing the porous polyimide film is preferable.

By producing the porous polyimide film by the method described in the above-mentioned section of the method for producing a porous polyimide film using the polyimide precursor described in the above-mentioned section of the polyimide precursor, the porous polyimide film having a lower dielectric constant is easily produced.

The relative dielectric constant of the porous polyimide film at 1 MHz is preferably 2.5 or less, for example. The relative dielectric constant is more preferably 1.5 or less, and still more preferably 1.4 or less, for example. The lower limit value of the relative dielectric constant is not particularly specified, but is preferably larger than 1, which is the relative dielectric constant of air.

For the relative dielectric constant at 1 MHz, the capacitance and loss at a frequency of 1 GHz are measured by an LCR meter by the parallel plate method. Further, the film thickness is measured at room temperature of 23±2° C. using a micro thickener manufactured by Toyo Seiki Co., Ltd., KBM (trademark), and the dielectric constant is calculated from these.

The measurement is performed by using an LCR meter (ZM2372, manufactured by NF Circuit Design Block Co., Ltd.), and a test piece (8 mm width×8 mm length) of a facing parallel plate of a porous polyimide film.

The porous polyimide film is not particularly limited, but the porosity may be 30% or more. Further, the porosity may be 40% or more, and more preferably 50% or more. The upper limit of the porosity is not particularly limited, but may be in the range of 90% or less.

The shape of the pores is preferably spherical or close to spherical, for example. Further, the pores are preferably in a shape in which the pores are connected to each other and connected to each other, for example. The pore diameter of the portion where the pores are connected to each other may be, for example, 1/100 or more and 1/2 or less of the maximum diameter of the pores, preferably 1/50 or more and 1/3 or less, and more preferably 1/20 or more and 1/4 or less. Specifically, the average value of the pore diameters of the portions where the pores are connected to each other and connected to each other may be, for example, 5 nm or more and 1500 nm or less.

The pore diameter of the pores of the porous polyimide film is, for example, preferably in the range of 0.1 μm or more and 1 μm or less, more preferably in the range of 0.12

µm or more and 0.98 µm or less, and still more preferably in the range of 0.14 µm or more and 0.96 µm or less.

The pore diameter of the pores of the porous polyimide film is not limited to the above range, and is preferably changed according to the application, for example.

In the porous polyimide film of the present exemplary embodiment, for example, the ratio of the maximum diameter to the minimum diameter of the pores (the ratio of the maximum value to the minimum value of the pore diameter) is 1 or more and 2 or less. The ratio is preferably 1 or more and 1.9 or less, and more preferably 1 or more and 1.8 or less. Within this range, for example, it is more preferable that the ratio is close to 1. Within this range, variation in pore diameter is suppressed. Further, in a case where the porous polyimide film of the present exemplary embodiment is applied to, for example, a battery separator of a lithium ion battery, it is possible to suppress the occurrence of turbulence in the ion flow, so that the formation of lithium dendrite is easily suppressed. The "ratio of the maximum diameter and the minimum diameter of the pores" is a ratio represented by a value obtained by dividing the maximum diameter of the pores by the minimum diameter (that is, the maximum value/the minimum value of the pore diameter).

The pore diameter and the pore diameter of the portion where the pores are connected to each other are values observed and measured by a scanning electron microscope (SEM). Specifically, first, a porous polyimide film is cut out and a sample for measurement is prepared. Then, this measurement sample is observed and measured by the VE SEM manufactured by KEYENCE with the image processing software provided as standard equipment. The observation and measurement are performed on 100 pieces for each of the pore portions in the cross section of the sample for measurement, and the average value, the minimum diameter, the maximum diameter, and the arithmetic mean diameter of each are obtained. In a case where the shape of the pore is not circular, the longest part is the diameter.

The film thickness of the porous polyimide film is not particularly limited, but may be 15 µm or more and 500 µm or less.

The film thickness of the porous polyimide film is measured in an environment of 23° C.±1° C. using a length measuring device (manufactured by Tokyo Seimitsu Co., Ltd., high-precision digital length measuring device MINI-AXPH-13 and the company's display unit DH-150).

Use of Porous Polyimide Film

Examples of applications to which the porous polyimide film according to the present exemplary embodiment is applied include, for example, a battery separator such as a lithium battery; a separator for an electrolytic capacitor; an electrolyte membrane such as a fuel cell; a battery electrode material; a gas or liquid separation membrane; Low dielectric constant materials; filter membranes; and the like.

EXAMPLES

Examples will be described below, but the present invention is not limited to these examples. In the following description, all "parts" and "%" are based on mass unless otherwise specified.

Synthesis of PSt Particle Dispersion-1

670 parts by mass of styrene, 17.0 parts by mass of the surfactant Dowfax2A1 (47% solution, manufactured by Dow Chemical Co., Ltd.), and 670 parts by mass of ion-exchanged water are mixed, and the mixture is stirred and emulsified at 1,500 revolutions for 30 minutes with a dissolver to prepare a monomer emulsion. Subsequently, 1.10 parts by mass of Dowfax2A1 (47% solution, manufactured by Dow Chemical Co., Ltd.) and 1500 parts by mass of ion-exchanged water are charged into the reaction vessel. After heating to 75° C. under a nitrogen stream, 75 parts by mass of the monomer emulsion is added, and then a polymerization initiator solution in which 15 parts by mass of ammonium persulfate is dissolved in 98 parts by mass of ion-exchanged water is added dropwise over 10 minutes. After the reaction is carried out for 50 minutes after the dropping, the remaining monomer emulsion is added dropwise over 220 minutes, and the reaction is further carried out for 50 minutes and then cooled to obtain a PSt particle dispersion-1. The solid content concentration is 22.8% by mass. The volume-average particle size of the resin particles is 0.42 µm.

Synthesis of PSt Particle Dispersion Solution-2

670 parts by mass of styrene, 12.1 parts by mass of the surfactant Dowfax2A1 (47% solution, manufactured by Dow Chemical), and 670 parts by mass of ion-exchanged water are mixed, and the mixture is stirred and emulsified at 1,500 revolutions for 30 minutes by a dissolver to prepare a monomer emulsion.

To the reaction vessel, 1.10 parts by mass of Dowfax2A1 (47% solution, manufactured by Dow Chemical Co., Ltd.) and 1500 parts by mass of ion-exchanged water are charged. After heating to 75° C. under a nitrogen stream, 70 parts by mass of the monomer emulsion is added, and then a polymerization initiator solution in which 15 parts by mass of ammonium persulfate is dissolved in 98 parts by mass of ion-exchanged water is added dropwise over 10 minutes. After the reaction is carried out for 50 minutes after the dropping, the remaining monomer emulsion is added dropwise over 220 minutes, and the reaction is further carried out for 50 minutes and then cooled to obtain a PSt particle dispersion-2. The average particle size of the resin particles is 0.81 µm.

Synthesis of PMMA Particle Dispersion-1

670 parts by mass of methyl methacrylate, 25.0 parts by mass of the surfactant Dowfax2A1 (47% solution, manufactured by Dow Chemical), and 670 parts by mass of ion-exchanged water are mixed, and the mixture is stirred and emulsified at 1,500 revolutions for 30 minutes by a dissolver to prepare a monomer emulsion. Subsequently, 1.10 parts by mass of Dowfax2A1 (47% solution, manufactured by Dow Chemical Co., Ltd.) and 1500 parts by mass of ion-exchanged water are charged into the reaction vessel. After heating to 75° C. under a nitrogen stream, 75 parts by mass of the monomer emulsion is added, and then a polymerization initiator solution in which 15 parts by mass of ammonium persulfate is dissolved in 98 parts by mass of ion-exchanged water is added dropwise over 10 minutes. After the reaction is carried out for 50 minutes after the dropping, the remaining monomer emulsion is added dropwise over 220 minutes, and after further reacting for 50 minutes, the mixture is cooled to obtain PMMA particle dispersion-1 which is a dispersion of resin particles. The solid content concentration is 22.8% by mass. The average particle size of the resin particles is 0.42 µm.

Example 1

Preparation of Particle-Dispersed Polyimide Precursor Solution

To the Pst particle dispersion-1:438.6 g (particles: 100 g, water: 338.6 g) is added ion-exchanged water: 40.66 g and N-methylpyrrolidone: 2.14 g as an aqueous solvent, 9,9-bis (4-aminophenyl)fluorene (molecular weight 348.45): 25.3 g (0.0727 mol) as a fluorene-based diamine, p-phenylenediamine (molecular weight 108.14): 1.96 g (0.0181687 mol) as another diamine, and 3,3',4,4'-biphenyltetracarboxylic dianhydride (molecular weight 294.22): 26.86 g (0.0913 mol) as a tetracarboxylic dianhydride, and the mixture is dispersed by stirring at 20° C. for 10 minutes. Then, 27.7 g (0.2739 mol) of N-methylmorpholine as an organic amine compound is slowly added, and the mixture is dissolved and reacted by stirring for 24 hours while maintaining the reaction temperature at 60° C. to obtain an aqueous particle-dispersed polyimide precursor solution. particle mass/(mass of total solid content) is 0.74, solid content concentration: 25% by mass. The obtained particle-dispersed polyimide precursor solution is diluted with water, and the particle size distribution is measured by the method described above, and the particle-dispersed polyimide precursor solution is found to be in a good dispersed state.

Preparation of Porous Polyimide Film

The particle-dispersed polyimide precursor solution thus obtained is applied to a glass base material having a width of 200 mm by using an applicator so that the film thickness after baking is 20 μm, air-dried at 80° C. for 1 hour, and then heated from 80° C. to a temperature increasing rate of 2° C./min to 400° C., and held at that temperature for 90 minutes. Then, after cooling to room temperature (25° C.) and immersing in water, a porous polyimide film is obtained.

Examples 2 to 9, Comparative Examples 1 to 4

As shown in Tables 1 and 2, the types and amounts of tetracarboxylic dianhydride, the types and amounts of fluorene-based diamines, the types and amounts of other diamines, the types and amounts of particle dispersions, and A porous polyimide film is produced in the same manner as in Example 1 except that the mass ratios of the aqueous solvents, ion-exchanged water and N-methylpyrrolidone, are changed.

Relative dielectric constant at 1 MHz

For the porous polyimide film obtained in each Example, the relative dielectric constant at 1 MHz is measured according to the method described.

TABLE 1-A

| Particle-dispersed polyimide precursor solution type | | Example 1 A1 | Example 2 A2 | Example 3 A3 | Example 4 A4 | Comparative example 1 CA1 | Comparative example 2 CA2 | Comparative example 3 CA3 |
|---|---|---|---|---|---|---|---|---|
| Tetra-carboxylic acid | type amount (grams/moles) | BPDA 26.86/ 0.0913 | BPDA 26.86/ 0.0913 | BPDA 26.86/ 0.0913 | PM DA 19.94/ 0.0913 | PM DA 19.94/ 0.0913 | BPDA 26.86/ 0.0913 | BPDA 26.86/ 0.0913 |
| Fluorene-based diamine | type amount (grams/moles) | BAFL 28.6/ 0.0822 | BAFL 25.5/ 0.0730 | BAFL 23.9/ 0.0685 | BAFL 27.1/ 0.0777 | BAFL 15.9/ 0.0457 | BAFL 11.1/ 0.0320 | BAFL 9.55/ 0.0274 |
| | content (with respect to precursor) | 50.1% | 46.9% | 44.9% | 55.8% | 38.5% | 25.1% | 22.0% |
| | content (with respect to particles) | 28.6% | 25.5% | 23.9% | 27.1% | 15.9% | 11.1% | 9.55% |
| Other diamine | type | PPD | PPD | PPD | PPD | PPD | PPD | PPD |
| | amount (grams/moles) | 0.987/ 0.00913 | 1.97/ 0.0183 | 2.47/ 0.0228 | 1.48/ 0.0137 | 5.43/ 0.0502 | 6.42/ 0.0593 | 6.91/ 0.0639 |
| Molar ratio (fluorene-based diamine/other diamine) | | 9 | 4 | 3 | 5.7 | 0.91 | 0.54 | 0.43 |
| Particles | particle dispersion type | PSt-1 | PSt-1 | PSt-1 | PSt-1 | — | — | — |
| | amount (grams of particles/ grams of water) | 100/ 338.6 | 100/ 338.6 | 100/ 338.6 | 100/ 338.6 | — | — | — |
| | particle size (μm) | 0.42 | 0.42 | 0.42 | 0.42 | — | — | — |
| | content (with respect to precursor + particles) | 64.7% | 62.60 | 62.3% | 61.6% | — | — | — |

TABLE 1-B

| Particle-dispersed polyimide precursor solution type | | Example 1 A1 | Example 2 A2 | Example 3 A3 | Example 4 A4 | Comparative example 1 CA1 | Comparative example 2 CA2 | Comparative example 3 CA3 |
|---|---|---|---|---|---|---|---|---|
| Aqueous solvent | solvent 1 | water | water | water | water | — | — | — |
| | solvent 2 | NMP | NMP | NMP | NMP | NMP | NMP | NMP |
| | mass ratio (solvent 1/ solvent 2) | 90/10 | 92/8 | 93/7 | 90/10 | 90/10 | 0/100 | 0/100 |

TABLE 1-B-continued

| Particle-dispersed polyimide precursor solution type | | Example 1 A1 | Example 2 A2 | Example 3 A3 | Example 4 A4 | Comparative example 1 CA1 | Comparative example 2 CA2 | Comparative example 3 CA3 |
|---|---|---|---|---|---|---|---|---|
| | aprotonic polar solvent content (with respect to particles) | 2.1 | 2.3 | 2.4 | 2.1 | — | — | — |
| Organic amine | type | NMM | NMM | NMM | NMM | NMM | NMM | NMM |
| Polyimide film | type | PI-1 | PI-2 | PI-3 | PI-4 | PI-C1 | PI-C2 | PI-C3 |
| | pore size (μm) | 0.42 | 0.42 | 0.42 | 0.42 | — | — | — |
| | dielectric constant | 1.38 | 1.55 | 1.71 | 1.41 | 2.4 | 2.7 | 2.9 |

TABLE 2-A

| Particle-dispersed polyimide precursor solution type | | Comparative example 4 CA4 | Example 5 A5 | Example 6 A6 | Example 7 A7 | Example 8 A8 | Example 9 A9 |
|---|---|---|---|---|---|---|---|
| Tetra-carboxylic acid | type | BPDA | BPDA | BPDA | BPDA | BPDA | BPDA |
| | amount (gram/moles) | 26.86/0.0913 | 26.86/0.0913 | 26.86/0.0913 | 26.86/0.0913 | 26.86/0.0913 | 26.86/0.0913 |
| Flourene-based diamine | type | — | BAMFL | BAFL | BAFL | BAFL | BAFL |
| | amount (grams/moles) | — | 26.8/0.0712 | 20.7/0.0593 | 25.1/0.0721 | 27.4/0.0785 | 23.5/0.0676 |
| | content (with respect to precursor) | — | 48.0% | 40.6% | 46.5% | 49.2% | 44.4% |
| | content (with respect to particles) | — | 26.8% | 20.7% | 25.1% | 27.4 | 23.5% |
| Other diamine | type | MPD | PPD | PPD | PPD | PPD | PPD |
| | amount (grams/moles) | 9.87/0.0913 | 2.17/0.0209 | 3.46/0.0320 | 2.07/0.0192 | 0.98/0.00910 | 1.83/0.0170 |
| Molar ratio (fluorene-based diamine/other diamine) | | — | 3.5 | 1.8 | 3.7 | 6.1 | 2.8 |
| Particles | particle dispersion type | PSt-1 | PSt-1 | silica | PMMA-1 | PSt-2 | PSt-1 |
| | amount (grams of particles/grams of water) | 100/338.6 | 100/338.6 | 100/338.6 | 100/338.6 | 100/338.6 | 100/338.6 |
| | particle size (μm) | 0.42 | 0.42 | 0.30 | 0.40 | 0.81 | 0.42 |
| | content (with respect to precursor + particles) | 64.7% | 65.5% | 64.7% | 65.5% | 65.7% | 74.3% |

TABLE 2-B

| Particle-dispersed polyimide precursor solution type | | Comparative example 4 CA4 | Example 5 A5 | Example 6 A6 | Example 7 A7 | Example 8 A8 | Example 9 A9 |
|---|---|---|---|---|---|---|---|
| Aqueous solvent | solvent 1 | water | water | water | water | water | water |
| | solvent 2 | NMP | NMP | NMP | NMP | NMP | NMP |
| | mass ratio (solvent 1/solvent 2) | 90/10 | 90/10 | 90/10 | 90/10 | 90/10 | 90/10 |
| | aprotonic polar solvent content (with respect to particles) | 2.1 | 2.3 | 2.5 | 2.1 | 2.2 | 2.2 |

TABLE 2-B-continued

| Particle-dispersed polyimide precursor solution type | | Comparative example 4 CA4 | Example 5 A5 | Example 6 A6 | Example 7 A7 | Example 8 A8 | Example 9 A9 |
|---|---|---|---|---|---|---|---|
| Organic amine | type | NMM | NMM | NMM | NMM | NMM | NMM |
| Polyimide film | type | PI-C4 | PI-5 | PI-6 | PI-7 | PI-8 | PI-9 |
| | pore size (μm) | 0.42 | 0.42 | 0.3 | 0.40 | 0.81 | 0.42 |
| | dielectric constant | 2.03 | 1.58 | 1.90 | 1.50 | 1.32 | 1.73 |

Details of the abbreviations in Tables are shown below.
BPDA: 3,3',4,4'-biphenyltetracarboxylic dianhydride
PMDA: pyromellitic anhydride
BAFL: 9,9-bis(4-aminophenyl) fluorene
BAMFL: 9,9-bis(4-amino-3-methylphenyl)fluorene
PPD: p-phenylenediamine
NMM: N-methylmorpholine
NMP: N-methylpyrrolidone
PSt-1: PSt particle dispersion-1
PSt-2: PSt particle dispersion-2
PMMA-1: PMMA particle dispersion-1
MPD: m-phenylenediamine
Molar ratio (fluorene-based diamine/other diamine):Total number of moles of structure derived from fluorene-based diamine to total number of moles of structure derived from other diamines
Fluorene-based diamine content (with respect to precursor):Total content of structure derived from fluorene-based diamine with respect to total amount of polyimide precursor in particle-dispersed polyimide precursor solution
Aprotonic polar solvent content (with respect to particles):Content of aprotonic polar solvent with respect to 100 parts by mass of particles in particle-dispersed polyimide precursor solution
Particle content (with respect to precursor+particles): Content of particles with respect to total amount of polyimide precursor and particles in particle-dispersed polyimide precursor solution
Fluorene-based diamine content (with respect to particles):Total content of structure derived from fluorene-based diamine with respect to particles in particle-dispersed polyimide precursor solution
In addition, "-" indicates that the corresponding component is not contained.

From the above results, it can be seen that the particle-dispersed polyimide precursor solution of Examples of the present exemplary embodiment provides a porous polyimide film having a lower dielectric constant.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A particle-dispersed polyimide precursor solution, comprising:
a polyimide precursor consisting of a polymer of a tetracarboxylic dianhydride and a diamine containing a fluorene-based diamine having a fluorene skeleton;
particles; and
an aqueous solvent containing water,
wherein a total content of a structure derived from the fluorene-based diamine is 1% by mass or more and 50% by mass or less with respect to the particles.

2. The particle-dispersed polyimide precursor solution according to claim 1, wherein the polyimide precursor is a polyimide precursor having a unit represented by the following Formula (I):

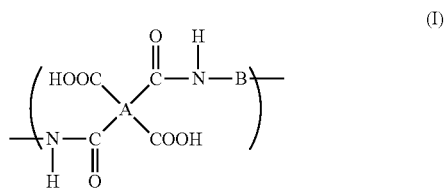

wherein A represents a tetravalent organic group, and B represents a divalent organic group represented by the following Formula (B1) derived from the fluorene-based diamine, and

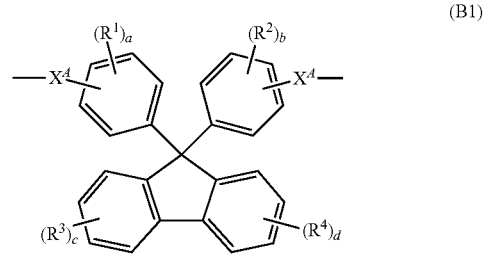

wherein $R^1$ to $R^4$ each independently represent a halogeno group, an alkyl group, an alkoxy group, or an aryl group, a to d each independently represent an integer of 0 to 4, and $X^A$ is a single bond or a divalent organic group.

3. The particle-dispersed polyimide precursor solution according to claim 2, wherein the total content of the structure derived from the fluorene-based diamine is 40% by mass or more and 60% by mass or less with respect to a total amount of the polyimide precursor.

4. The particle-dispersed polyimide precursor solution according to claim 3, wherein the total content of the structure derived from the fluorene-based diamine is 45% by mass or more and 60% by mass or less with respect to the total amount of the polyimide precursor.

5. The particle-dispersed polyimide precursor solution according to claim 1, wherein the particles are resin particles.

6. The particle-dispersed polyimide precursor solution according to claim 2, wherein the particles are resin particles.

7. The particle-dispersed polyimide precursor solution according to claim 3, wherein the particles are resin particles.

8. The particle-dispersed polyimide precursor solution according to claim 4, wherein the particles are resin particles.

9. The particle-dispersed polyimide precursor solution according to claim 1, further comprising:
an organic amine compound,
wherein a content of the water is 50% by mass or more with respect to a total amount of the aqueous solvent.

10. The particle-dispersed polyimide precursor solution according to claim 9, wherein the aqueous solvent further contains an aprotonic polar solvent, and a content of the aprotonic polar solvent is 1 part by mass or more and 50 parts by mass or less with respect to 100 parts by mass of the particles.

11. The particle-dispersed polyimide precursor solution according to claim 1, wherein a volume-average particle size of the particles is 0.1 μm or more and 1 μm or less.

12. The particle-dispersed polyimide precursor solution according to claim 1, wherein a content of the particles is 30% by mass or more and 85% by mass or less with respect to a total amount of the polyimide precursor and the particles.

13. A method for producing a porous polyimide film, comprising:
applying the particle-dispersed polyimide precursor solution according to claim 1 to form a coating film, and then drying the coating film to Ram a film containing the polyimide precursor and the particles; and
heating the film to imidize the polyimide precursor to form a polyimide film, which includes a process of removing the particles.

14. A porous polyimide film comprising:
a polyimide obtained by imidizing a polyimide precursor consisting of a polymer of a tetracarboxylic dianhydride and a diamine containing a fluorene-based diamine having a fluorene skeleton; and
pores.

15. The porous polyimide film according to claim 14, wherein the pore diameter of the pores is 0.1 μm or more and 1 μm or less.

* * * * *